(12) United States Patent
Azuma et al.

(10) Patent No.: US 11,630,662 B2
(45) Date of Patent: Apr. 18, 2023

(54) SOFTWARE ANALYSIS DEVICE, SOFTWARE ANALYSIS METHOD, AND SOFTWARE ANALYSIS PROGRAM

(71) Applicant: Mitsubishi Electric Corporation, Tokyo (JP)

(72) Inventors: Taishi Azuma, Tokyo (JP); Toshihiro Kobayashi, Tokyo (JP); Yuki Hikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 220 days.

(21) Appl. No.: 17/268,840

(22) PCT Filed: Oct. 3, 2018

(86) PCT No.: PCT/JP2018/036996
§ 371 (c)(1),
(2) Date: Feb. 16, 2021

(87) PCT Pub. No.: WO2020/070817
PCT Pub. Date: Apr. 9, 2020

(65) Prior Publication Data
US 2021/0232392 A1 Jul. 29, 2021

(51) Int. Cl.
*G06F 9/44* (2018.01)
*G06F 8/75* (2018.01)
(Continued)

(52) U.S. Cl.
CPC .............. *G06F 8/75* (2013.01); *G06F 8/433* (2013.01); *G06F 8/74* (2013.01)

(58) Field of Classification Search
None
See application file for complete search history.

(56) References Cited

U.S. PATENT DOCUMENTS 6,131,109 A    10/2000  Ueki et al.
8,006,230 B2*  8/2011  Agarwal ............... G06F 11/008
                                                      717/121
(Continued)

FOREIGN PATENT DOCUMENTS

JP    H05165680 A    7/1993
JP    H10240578 A    9/1998
(Continued)

OTHER PUBLICATIONS

Extended European Search Report dated Sep. 15, 2021, issued in corresponding European Patent Application No. 18936141.3, 9 pages.
(Continued)

*Primary Examiner* — Anna C Deng
(74) *Attorney, Agent, or Firm* — Buchanan Ingersoll & Rooney PC

(57) ABSTRACT

A software analysis device being capable of analyzing dependency between software components more comprehensively and with higher accuracy than a conventional technology is provided. The software analysis device comprising: a first analyzing unit that statically analyzes a structure of a source code of software and analyzes dependency between objects of the software; and a second analyzing unit that executes a program indicated by the source code to acquire first information regarding an operation of the objects and analyzes dependency between the objects based on the first information. The software analysis device analyzes dependency between the objects based on an analysis result of the first analyzing unit and an analysis result of the second analyzing unit.

15 Claims, 52 Drawing Sheets

(51) Int. Cl.
*G06F 8/41* (2018.01)
*G06F 8/74* (2018.01)

(56) References Cited

U.S. PATENT DOCUMENTS

| | | | |
|---|---|---|---|
| 9,342,300 B2* | 5/2016 | Kwon | G06F 8/71 |
| 9,483,240 B1* | 11/2016 | Boyar | G06F 8/72 |
| 10,089,218 B2* | 10/2018 | Lopian | G06F 11/3684 |
| 10,535,026 B2* | 1/2020 | Berlandier | G06Q 10/06316 |
| 2007/0250827 A1 | 10/2007 | Ohyama et al. | |
| 2008/0209397 A1* | 8/2008 | Mohindra | G06F 9/5038 717/120 |
| 2014/0181836 A1* | 6/2014 | Tripp | G06F 9/4843 718/106 |
| 2014/0289712 A1* | 9/2014 | Gupta | G06F 8/433 717/131 |
| 2017/0351596 A1* | 12/2017 | Sheridan | G06F 11/3604 |
| 2018/0074798 A1 | 3/2018 | Ambrose et al. | |
| 2018/0140193 A1 | 5/2018 | Kubo et al. | |
| 2019/0042393 A1 | 2/2019 | Hiramatsu | |

FOREIGN PATENT DOCUMENTS

| | | |
|---|---|---|
| JP | 2000284988 A | 10/2000 |
| JP | 2001290639 A | 10/2001 |
| JP | 2003256235 A | 9/2003 |
| JP | 2007293383 A | 11/2007 |
| JP | 2009237654 A | 10/2009 |
| JP | 2013-117803 A | 6/2013 |
| JP | 2013156786 A | 8/2013 |
| JP | WO2017141893 A1 | 4/2018 |
| WO | 2018/081629 A1 | 5/2018 |
| WO | 2018096632 A1 | 5/2018 |

OTHER PUBLICATIONS

Japanese Office Action dated Nov. 16, 2021, issued in corresponding Japanese Patent Application No. 2020-550997, 10 pages.
Communication pursuant to Article 94(3) EPC dated Jun. 8, 2022, issued in corresponding European Patent Application No. 18936141.3, 7 pages.
"Python—How to combine two lists, remove duplicates, without changing element order of the lists?—Stack Overflow", Retrieved from the Internet:URL:https://stackoverflow.com/questions/43324940/how-tocombine-two-lists-remove-duplicates-without-changing-elementorder-of-t, XP055926906, Apr. 10, 2017, pp. 1-4.
International Search Report (PCT/ISA/210) with translation and Written Opinion (PCT/ISA/237) dated Nov. 20, 2018, by the Japan Patent Office as the International Searching Authority for International Application No. PCT/JP2018/036996.
Anonymous: "Data deduplication—Wikipedia", Retrieved from the internet: <<https://en.wikipedia.org/w/index.php?title=Data_deduplication&oldid=834489466>> [retrieved on Jun. 1, 2022], Apr. 6, 2018, pp. 1-7.
Office Action issued in corresponding European Patent Application No. 18936141.3, dated Jan. 17, 2023, 3 pages.

* cited by examiner

Fig.4a

```
include<stdio.h> void (*pf)(char*);

void func(char* c){
   printf("%s¥n", c);
} void test1(){
   pf = func;
} void test2(){
   pf("test2");
} void test3(){
   func("test3");
} int main(){
   test1();
   test2();
   test3();
   return 0;
}
```

| No. | FUNCTION | CALL DESTINATION FUNCTION |
|---|---|---|
| 1 | main | test1, test2, test3 |
| 2 | func | printf |
| 3 | test1 | - |
| 4 | test2 | pf |
| 5 | test3 | func |
| 6 | pf | - |
| 7 | printf | - |

| No. | DEPENDENT SOURCE | DEPENDENT DESTINATION |
|---|---|---|
| 1 | main | test1 |
| 2 | main | test2 |
| 3 | test2 | pf |
| 4 | main | test3 |
| 5 | test3 | func |
| 6 | func | printf |

Fig. 6

```
include<stdio.h> void (*pf)(char*);

void func(char* c){
  func_IN();
  printf("%s¥n", c);
  func_OUT();
} void test1(){
  test1_IN();
  pf = func;
  test1_OUT();
} void test2(){
  test2_IN();
  pf("test2");
  test2_OUT();
} void test3(){
  test3_IN();
  func("test3");
  test3_OUT();
} int main(){
  main_IN();
  test1();
  test2();
  test3();
  return 0;
  main_OUT();
}
```

| EXECUTION ORDER | FUNCTION NAME | STATE |
|---|---|---|
| 1 | main | IN |
| 2 | test1 | IN |
| 3 | test1 | OUT |
| 4 | test2 | IN |
| 5 | func | IN |
| 6 | func | OUT |
| 7 | test2 | OUT |
| 8 | test3 | IN |
| 9 | func | IN |
| 10 | func | OUT |
| 11 | test3 | OUT |
| 12 | main | OUT |

| EXECUTION ORDER | LAYER 1 | LAYER 2 | LAYER 3 |
|---|---|---|---|
| - | | | |
| 1 | main | | |
| 2 | main | test1 | |
| 3 | main | | |
| 4 | main | test2 | |
| 5 | main | test2 | func |
| 6 | main | test2 | |
| 7 | main | | |
| 8 | main | test3 | |
| 9 | main | test3 | func |
| 10 | main | test3 | |
| 11 | main | | |
| 12 | | | |

⇐ push  test1
pop ⇒
⇐ push  test2
⇐ push  func
pop ⇒
pop ⇒
⇐ push  test3
⇐ push  func
pop ⇒
pop ⇒
pop ⇒

| No. | DEPENDENT SOURCE | DEPENDENT DESTINATION |
|---|---|---|
| 1 | main | test1 |
| 2 | main | test2 |
| 3 | test2 | func |
| 4 | main | test3 |
| 5 | test3 | func |

| No. | DEPENDENT SOURCE | DEPENDENT DESTINATION |
|---|---|---|
| 1 | main | test1 |
| 2 | main | test2 |
| 3 | test2 | pf |
| 4 | test2 | func |
| 5 | main | test3 |
| 6 | test3 | func |
| 7 | func | printf |

Fig.17

| CONTEXT ID | MESSAGE CONTENT | TRANSMISSION TASK | RECEPTION TASK |
|---|---|---|---|
| 0x0001 | MsgA01 | TASK A | TASK X |
| 0x0002 | MsgB01 | TASK B | TASK X |
| 0x0003 | MsgA02 | TASK A | TASK X |

```
include <stdio.h> struct Point { int x, y; };

void PrintPoint(struct Point *pt) {
        printf("X=%d, Y=%d¥n", pt->x, pt->y);
} int main(void) {
   struct Point pt1 = { 10, 20 };
   struct Point pt2 = { 100, 200 };

PrintPoint(&pt1);

return 0;
}
```

|     | x      | y      |
| --- | ------ | ------ |
| pt1 | 0x0000 | 0x0001 |
| pt2 | 0x0010 | 0x0011 |

| FUNCTION | START TIME | END TIME |
|---|---|---|
| main | 00:00 | 00:05 |
| PrintPoint | 00:05 | 00:20 |

| SHARED MEMORY ADDRESS | ACCESS TIME | |
|---|---|---|
| 0x0000 | 00:01 | 00:06 |
| 0x0001 | 00:02 | 00:09 |
| 0x0010 | 00:03 | |
| 0x0011 | 00:04 | |

| VARIABLE | pt1->x | pt1->y | pt2->x | pt2->y |
|---|---|---|---|---|
| SHARED MEMORY ADDRESS | 0x0000 | 0x0001 | 0x0010 | 0x0011 |
| ACCESSED FUNCTION | PrintPoint | PrintPoint | main | main |
|  | main | main |  |  |

| No. | DEPENDENT SOURCE | DEPENDENT DESTINATION |
|---|---|---|
| 1 | PrintPoint | main |
| 2 | main | PrintPoint |

| EXECUTION ORDER | FUNCTION NAME | STATE |
|---|---|---|
| 4 | test2 | IN |
| 5 | func | IN |
| 6 | func | OUT |
| 7 | test2 | OUT |
| 8 | test3 | IN |
| 9 | func | IN |
| 10 | func | OUT |
| 11 | test3 | OUT |
| 12 | main | OUT |

| No. | DEPENDENT SOURCE | DEPENDENT DESTINATION |
|---|---|---|
| 1 | test2 | func |
| 2 | test3 | func |
| 3 | main | test3 |
| 4 | main | test2 |

| EXECUTION ORDER | FUNCTION NAME | STATE | TASK |
|---|---|---|---|
| 1 | main | IN | Task1 |
| 2 | test1 | IN | Task1 |
| 3 | test1 | OUT | Task1 |
| 4 | test2 | IN | Task1 |
| 5 | interrupt | IN | Interrupt |
| 6 | interrupt | OUT | Interrupt |
| 7 | test2 | OUT | Task1 |
| 8 | test1 | IN | Task1 |
| 9 | test1 | OUT | Task1 |
| 10 | main | OUT | Task1 |

| EXECUTION ORDER | FUNCTION NAME | STATE |
|---|---|---|
| 1 | main | IN |
| 2 | test1 | IN |
| 3 | test1 | OUT |
| 4 | test2 | IN |
| 5 | test2 | OUT |
| 6 | test1 | IN |
| 7 | test1 | OUT |
| 8 | main | OUT |

| EXECUTION ORDER | LAYER 1 | LAYER 2 |
|---|---|---|
| 1 | main | |
| 2 | main | test1 |
| 3 | main | |
| 4 | main | test2 |
| 5 | main | |
| 6 | main | test1 |
| 7 | main | |
| 8 | | |

| No. | DEPENDENT SOURCE | DEPENDENT DESTINATION | DEPENDENT INTENSITY VALUE |
|---|---|---|---|
| 1 | main | test1 | 2 |
| 2 | main | test2 | 1 |

```
include<stdio.h> void test1(){
   printf("test1¥n");
} void test2(){
 printf("test1¥n");
} int main(){
   test1();
   test2();
   test1();

return 0;
}
```

| DEPENDENT SOURCE | DEPENDENT DESTINATION |
|---|---|
| main | test1 |
| test1 | printf |
| test2 | printf |
| main | test2 |

| DEPENDENT SOURCE | DEPENDENT DESTINATION | DEPENDENT INTENSITY VALUE |
|---|---|---|
| main | test1 | 2 |
| test1 | printf | - |
| test2 | printf | - |
| main | test2 | 1 |

Fig.49

| No. | DEPENDENT SOURCE | DEPENDENT DESTINATION |
|---|---|---|
| 1 | main | test1 |
| 2 | main | test2 |

| DEPENDENT SOURCE | DEPENDENT DESTINATION | IMPORTANCE |
|---|---|---|
| main | test1 | 1 |
| test1 | printf | - |
| test2 | printf | - |
| main | test2 | 1 |

```
include<stdio.h> void test1(){ printf("test1¥n"); };
void test2(){ printf("test2¥n"); };
void test3(){ printf("test3¥n"); };
void test4(){ printf("test3¥n"); };

void (*testTable[])()=
{
    test1, test2, test3, test4
};

int main()
{
    int i = rand();
    testTable[i](1);

return 0;
}
```

| No. | FUNCTION | CALL DESTINATION FUNCTION |
|-----|----------|---------------------------|
| 1 | main | - |
| 2 | test1 | printf |
| 3 | test2 | printf |
| 4 | test3 | printf |
| 5 | test4 | printf |

8032

| ARRAY ELEMENT NUMBER | CHARACTER STRING |
|----------------------|------------------|
| 1 | test1 |
| 2 | test2 |
| 3 | test3 |
| 4 | test4 |

Fig.56

| No. | DEPENDENT SOURCE | DEPENDENT DESTINATION |
|---|---|---|
| 1 | main | test1 |

12

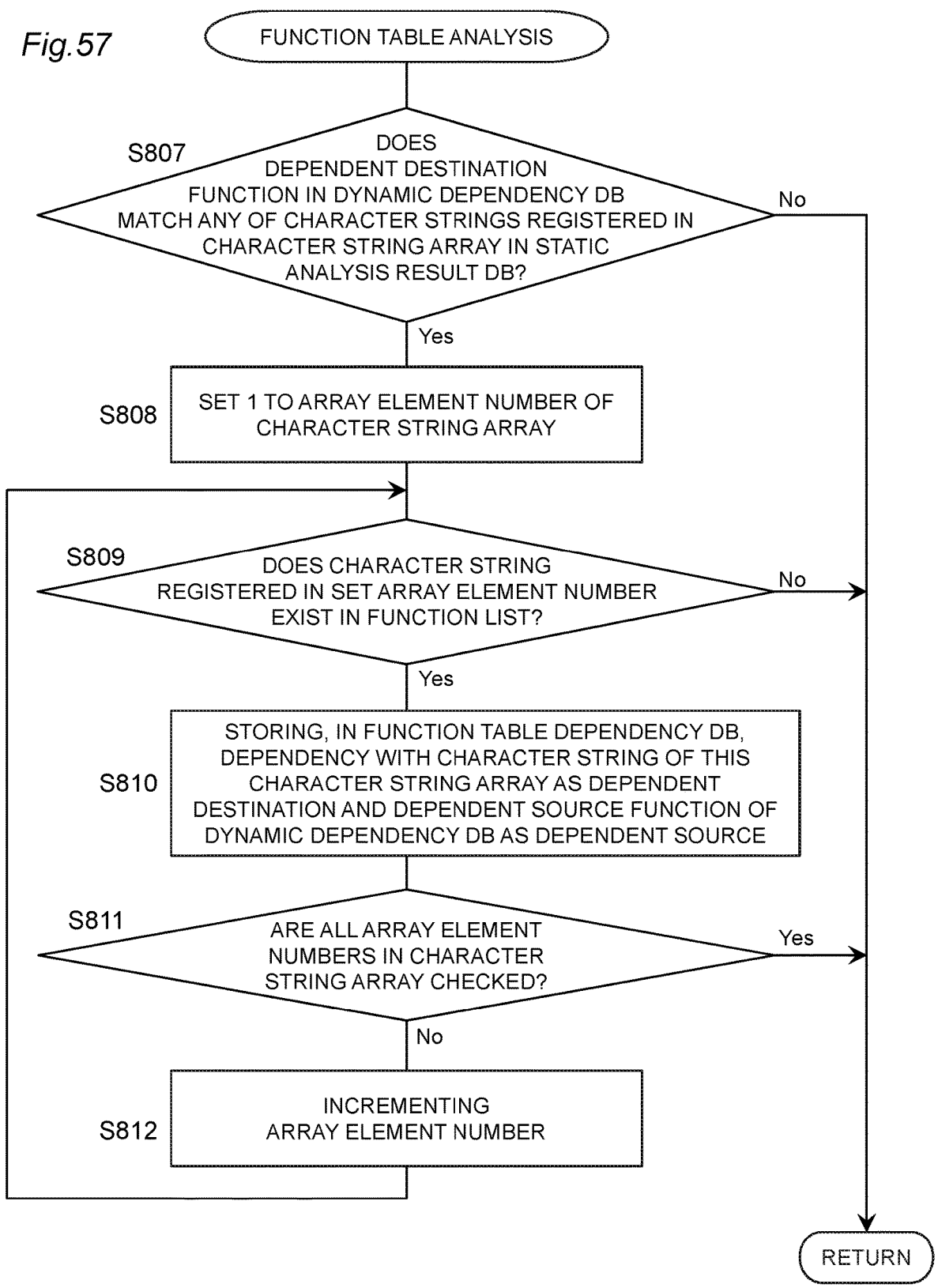

| No. | DEPENDENT SOURCE | DEPENDENT DESTINATION |
|---|---|---|
| 1 | main | test1 |
| 2 | main | test2 |
| 3 | main | test3 |
| 4 | main | test4 |

| No. | DEPENDENT SOURCE | DEPENDENT DESTINATION | INFLUENCE DEGREE |
|---|---|---|---|
| 1 | main | test1 | 1 |
| 2 | main | test2 | 0.25 |
| 3 | main | test3 | 0.25 |
| 4 | main | test4 | 0.25 |

| No. | DEPENDENT SOURCE | DEPENDENT DESTINATION | INFLUENCE DEGREE |
|---|---|---|---|
| 1 | main | test1 | 1 |
| 2 | main | test2 | 0.25 |
| 3 | main | test3 | 0.25 |
| 4 | main | test4 | 0.25 |

| EXECUTION ORDER | FUNCTION NAME | STATE |
|---|---|---|
| 1 | main | IN |
| 2 | test1 | IN |
| 3 | test1 | OUT |
| 4 | test2 | IN |
| 5 | test2 | OUT |
| 6 | main | OUT |

| EXECUTION ORDER | FUNCTION NAME | STATE |
|---|---|---|
| 1 | main | IN |
| 2 | test1 | IN |
| 3 | test1 | OUT |
| 4 | test3 | IN |
| 5 | test3 | OUT |
| 6 | main | OUT |

| No. | DEPENDENT SOURCE | DEPENDENT DESTINATION |
|---|---|---|
| 1 | main | test1 |
| 2 | main | test2 |

| No. | DEPENDENT SOURCE | DEPENDENT DESTINATION |
|---|---|---|
| 1 | main | test1 |
| 2 | main | test3 |

| No. | DEPENDENT SOURCE | DEPENDENT DESTINATION |
|---|---|---|
| 1 | main | test1 |
| 2 | main | test2 |
| 3 | main | test3 |

SOFTWARE ANALYSIS DEVICE, SOFTWARE ANALYSIS METHOD, AND SOFTWARE ANALYSIS PROGRAM

TECHNICAL FIELD

The present invention relates to a software analysis device, a software analysis method, and a software analysis program, and particularly relates to a software analysis device, a software analysis method, and a software analysis program for analyzing dependency between software objects.

BACKGROUND ART

In recent years, a scale and complexity of software development have been increased with increasing functionality of products. In addition, in order to quickly respond to a wide variety of requests, using existing software for development is the mainstream rather than developing new software. In order to grasp an extent of influence in a case of changing software, particularly in a case of changing existing software, it is necessary to analyze dependency between components such as software objects.

Patent Document 1 discloses a software structure visualization program including: a syntax analyzing unit to cause a computer to perform syntax analysis of a source code; and variable dependency analyzing unit to cause the computer to derive dependency between variables for multiple variables that are distinguished for every description position in the source code, from a syntax analysis result by the syntax analyzing unit. This allows designers and verifiers to understand a structure and a processing outline of software from the viewpoint of variable dependency.

Patent Document 2 discloses an object diagram display device including: source code processing means to process a source code into a program in which logs can be acquired; test execution means to execute the program processed by the source code processing means in a test case regarding a function to which a user pays attention, to acquire a log; log analysis means that analyzes the log acquired by the test execution means and collects a list of objects and a relationship between the objects; and object structure extraction means that extracts an object structure by connecting combinations of highly important objects based on the relationship between the objects collected by the log analysis means. This makes it possible to effectively support user's software development by displaying information required by a user in relationship information between classes including inclusion relationships and correspondences, and clarifying a relationship between classes when the program is actually executed, for visualization of a source code described in object-oriented languages.

PRIOR ART DOCUMENTS

Patent Documents

Patent Document 1: JP 2013-156786 A
Patent Document 2: WO 2018/96632 A

SUMMARY OF THE INVENTION

Problems to be Solved by the Invention

However, since the invention disclosed in Patent Document 1 uses a static syntax analysis result of a source code, it is not possible to analyze dependency between software components that will have dependency with a pointer variable or the like via an address.

The invention disclosed in Patent Document 2 uses, not only static analysis of a source code, but also dynamic analysis to execute the program in the test case to acquire a log. However, all dependency between software components is analyzed by static analysis, and a result of dynamic analysis is only used for showing importance of the dependency. Therefore, it is not possible to analyze dependency between software components that will have dependency with a pointer variable or the like via an address.

The present invention has been made to solve the above problems, and an object is to analyze dependency between software components more comprehensively and with higher accuracy than a conventional technology, based on dependency between software components obtained by static analysis and dependency between the software components obtained by dynamic analysis.

Means for Solving the Problems

One aspect of the present invention is to provide a software analysis device including: a first analyzing unit that statically analyzes a structure of a source code of software and analyzes dependency between objects of the software; and a second analyzing unit that executes a program indicated by the source code to acquire first information regarding an operation of the objects and analyzes dependency between the objects based on the first information. The software analysis device analyzes dependency between the objects based on an analysis result of the first analyzing unit and an analysis result of the second analyzing unit.

Another aspect of the present invention is to provide a software analysis method including: a first analysis step of statically analyzing a structure of a source code of software and analyzing dependency between objects of the software; and a second analysis step of executing a program indicated by the source code to acquire first information regarding an operation of the objects and analyzing dependency between the objects based on the first information; and a step of analyzing dependency between the objects based on an analysis result of the first analysis step and an analysis result of the second analysis step.

Yet another aspect of the present invention is to provide a software analysis program for causing a computer to execute the software analysis method described above.

Effects of the Invention

The present invention provides a software analysis device, a software analysis method, and a software analysis program capable of analyzing dependency between software components more comprehensively and with higher accuracy than a conventional technology.

BRIEF DESCRIPTION OF THE DRAWINGS

FIG. 4a is a view showing an example of a source code.

FIG. 4b is a table showing an example of a static analysis result database.

FIG. 4c is a table showing an example of a static dependency database.

FIG. 6 is a view showing an example of a corrected code.

FIG. 8 is a table showing an example of an operation log.

FIG. 10 is a table showing an example of a dynamic dependency analysis stack.

FIG. 11 is a table showing an example of a dynamic dependency database.

FIG. 13 is a table showing an example of an analysis result.

FIG. 17 is a table showing an example of a message log.

FIG. 22 is a view showing an example of a source code.

FIG. 23 is a table showing an address list of a shared memory.

FIG. 24 is a table showing an example of a function execution log.

FIG. 25 is a table showing an example of a shared memory access log.

FIG. 27 is a table showing an example of a shared memory access record.

FIG. 28 is a table showing an example of a dynamic dependency database.

FIG. 31 is a table showing an example of an operation log acquired from a middle of program execution.

FIG. 35 is a table showing an example of a dynamic dependency database.

FIG. 37 is a table showing an example of an operation log.

FIG. 43 is a table showing an example of a dynamic dependency database.

FIG. 44 is a view showing an example of a source code.

FIG. 45 is a table showing an example of a static dependency database.

FIG. 47 is a table showing an example of an analysis result after the step of analyzing comprehensive dependency is finished.

FIG. 49 is a table showing an example of a dynamic dependency database.

FIG. 51 is a table showing an example of an analysis result.

FIG. 54 is a view showing an example of a source code.

FIG. 55 is a table showing an example of a static analysis result database.

FIG. 56 is a table showing an example of a dynamic dependency database.

FIG. 57 is a flowchart showing a detailed flow of a step of analyzing dependency of functions in a function table shown in FIG. 52.

FIG. 58a is a table showing an example of a function table dependency database.

FIG. 58b is a table showing another example of the function table dependency database.

FIG. 59 is a table showing an example of an analysis result.

FIG. 61a is a table showing an example of an operation log obtained by executing an execution program by giving specific input data in a specific environment.

FIG. 61b is a table showing an example of an operation log obtained by executing the execution program in another environment or by giving other input data.

FIG. 62a is a table showing dynamic dependency obtained based on the operation log of FIG. 61a.

FIG. 62b is a table showing dynamic dependency obtained based on the operation log of FIG. 61b.

FIG. 62*c* is a table showing a dynamic dependency obtained by combining the dynamic dependency of FIG. 62*a* and the dynamic dependency of FIG. 62*b*.

EMBODIMENTS OF THE INVENTION

Figure 1:
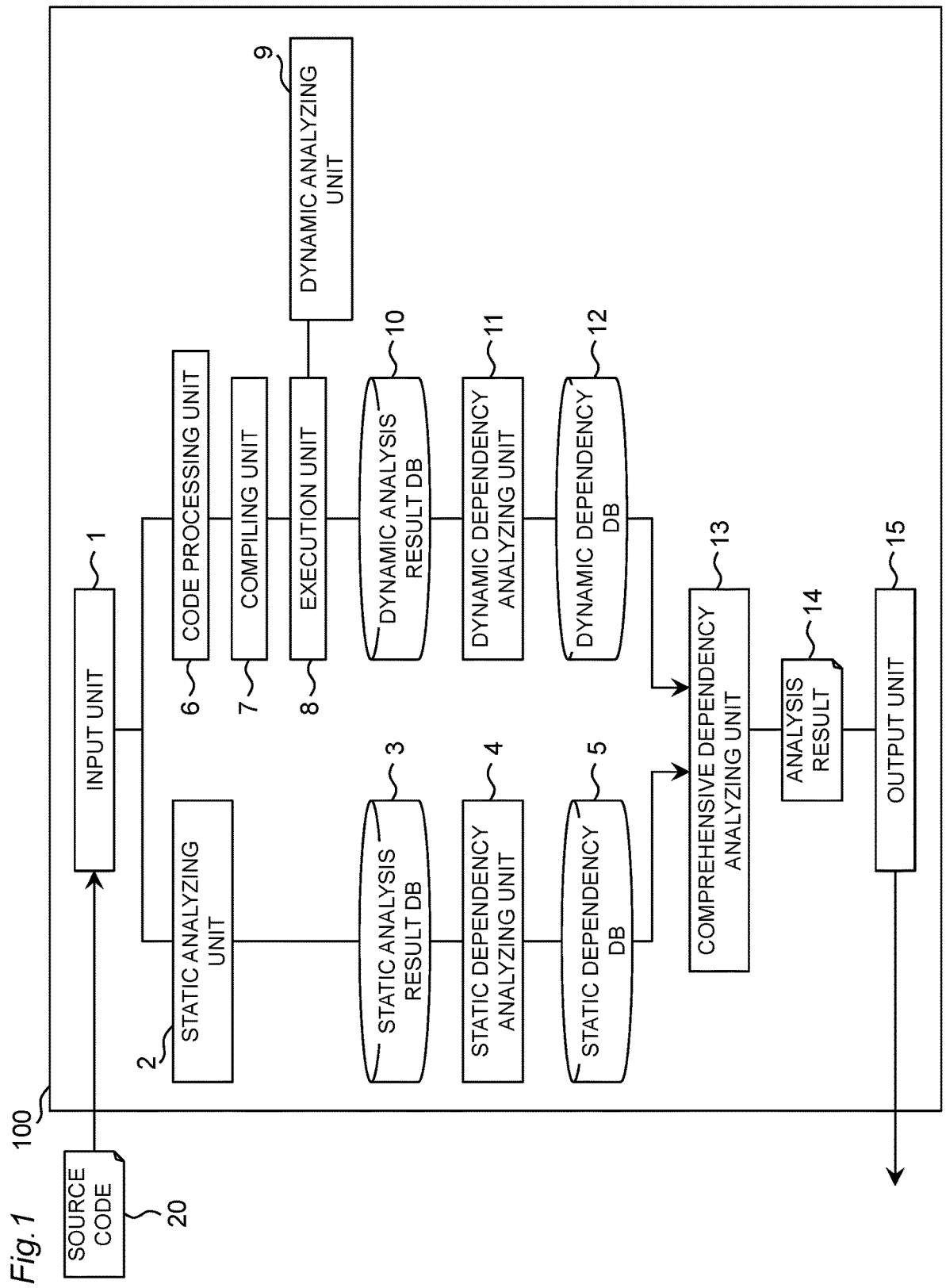
FIG. 1 is a block diagram showing a configuration of an analysis device according to a first embodiment of the present invention.

Hereinafter, an analysis device according to embodiments of the present invention will be described with reference to the drawings. In each embodiment, the same configurations are designated by the same reference numerals, and redundant description will be omitted.

First Embodiment

[1. Configuration]

FIG. 1 is a block diagram showing a configuration of an analysis device 100 according to a first embodiment of the present invention. The analysis device 100 includes an input unit 1, a static analyzing unit 2, a static analysis result database (DB) 3, a static dependency analyzing unit 4, and a static dependency database (DB) 5.

The input unit 1 reads a source code 20 that is executable as a program, and inputs to the analysis device 100. The source code 20 to be input is selected, for example, by file designation by a user. The source code is described, for example, in an object-oriented language.

The static analyzing unit 2 performs static structural analysis of the source code 20, and outputs an analysis result. Here, the static structural analysis refers to a technique for analyzing a syntax, a structure, and the like of a source code without executing a program. The static analysis result output from the static analyzing unit 2 includes information regarding dependency (also referred to as a call relationship or a called relationship) between software components (objects), such as class reference, function call, object call, and header file reference. Here, the object is a set of functions and data (for example, variables and constants).

The static analysis result database 3 stores the static analysis result output from the static analyzing unit 2.

The static dependency analyzing unit 4 analyzes the static analysis result stored in the static analysis result database 3, and organizes dependency between software components, to store in the static dependency database 5.

The analysis device 100 further includes a code processing unit 6, a compiling unit 7, an execution unit 8, a dynamic analyzing unit 9, and a dynamic analysis result database (DB) 10.

The source code 20 input to the input unit 1 is transmitted not only to the static analyzing unit 2 but also to the code processing unit 6 for dynamic analysis. The code processing unit 6 processes the source code 20 to create a corrected code that enables a log to be acquired.

The compiling unit 7 compiles the corrected code. That is, the compiling unit 7 converts the corrected code into an execution program in an executable format, such as machine language.

The execution unit 8 executes the execution program. At this time, the dynamic analyzing unit 9 monitors processing of the execution program, generates a log such as an execution log and an access log, and stores in the dynamic analysis result database 10.

The analysis device 100 further includes a dynamic dependency analyzing unit 11 and a dynamic dependency database (DB) 12. The dynamic dependency analyzing unit 11 analyzes dependency between software components, from information stored in the dynamic analysis result database 10, to store in the dynamic dependency database 12.

The analysis device 100 further includes a comprehensive dependency analyzing unit 13 and an output unit 15. The comprehensive dependency analyzing unit 13 combines static dependency stored in the static dependency database 5 with dynamic dependency stored in the dynamic dependency database 12, to output an analysis result 14 showing comprehensive dependency between software components. The output unit 15 outputs the analysis result 14 to the outside of the analysis device 100.

The static analysis result database 3, the static dependency database 5, the dynamic analysis result database 10, and the dynamic dependency database 12 are media that record various kinds of information. Each of these databases is realized by, for example, a semiconductor memory device such as a ROM, flash memory, or an SSD, a disk device such as a hard disk, or other storage device alone, or by combining them as appropriate.

The analysis device 100 is realized by software. For example, the static analyzing unit 2, the static dependency analyzing unit 4, the code processing unit 6, the compiling unit 7, the execution unit 8, the dynamic analyzing unit 9, the dynamic dependency analyzing unit 11, the comprehensive dependency analyzing unit 13, and the output unit 15, of the analysis device 100, are realized by a program. Such a program is stored in the storage device described above, and is called and executed by a general-purpose processor such as a CPU or an MPU.

[2. Operation]

Figure 2:
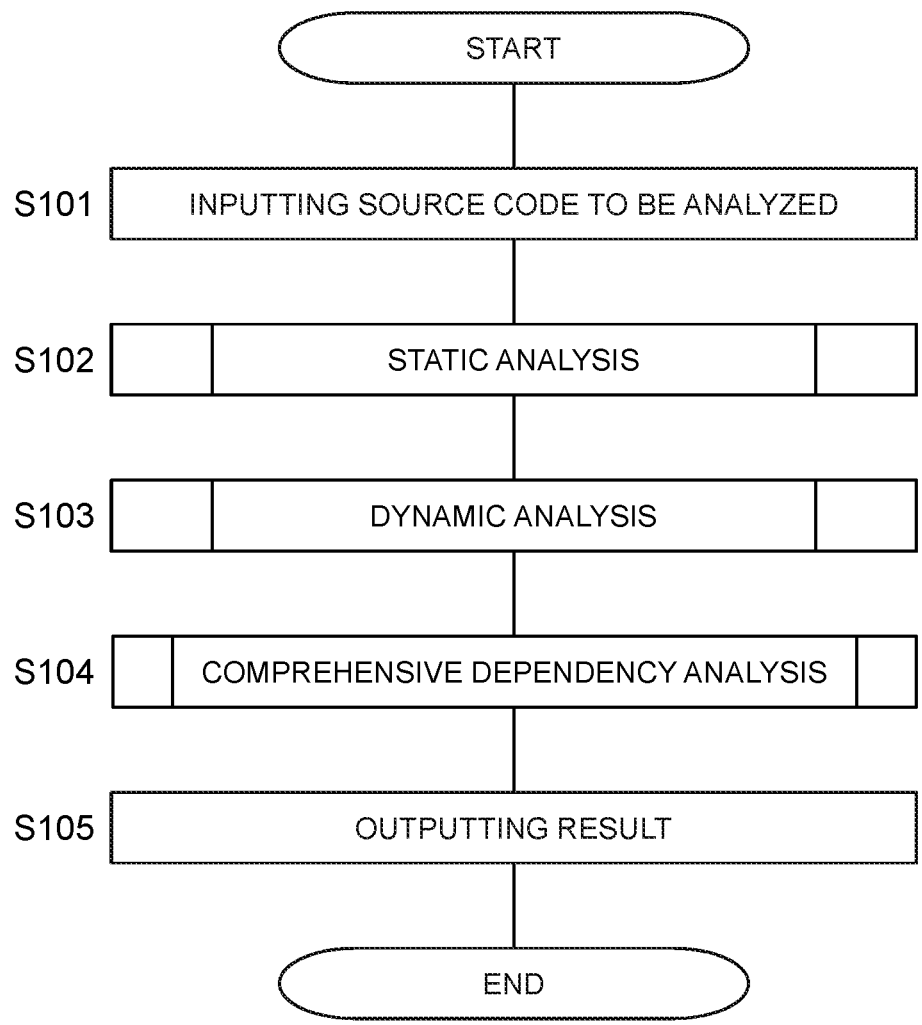
FIG. 2 is a flowchart showing an operation flow of the analysis device according to the first embodiment of the present invention.

FIG. 2 is a flowchart showing an operation flow of the analysis device 100. First, the analysis device 100 reads the source code 20 via the input unit 1 (S101). Next, the analysis device 100 executes static analysis on the source code 20, and analyzes static dependency (S102). Next, the analysis device 100 executes dynamic analysis on the source code 20, and analyzes dynamic dependency (S103). The analysis device 100 combines the static dependency obtained in step S102 with the dynamic dependency obtained in step S103, to analyze comprehensive dependency (S104). Finally, the analysis device 100 outputs the analysis result 14 obtained in step S104, from the output unit 15 (S105). Note that an execution order of step S102 and step S103 may be reversed, and step S103 may be executed before step S102.

[2-1. Static Analysis]

Figure 3:
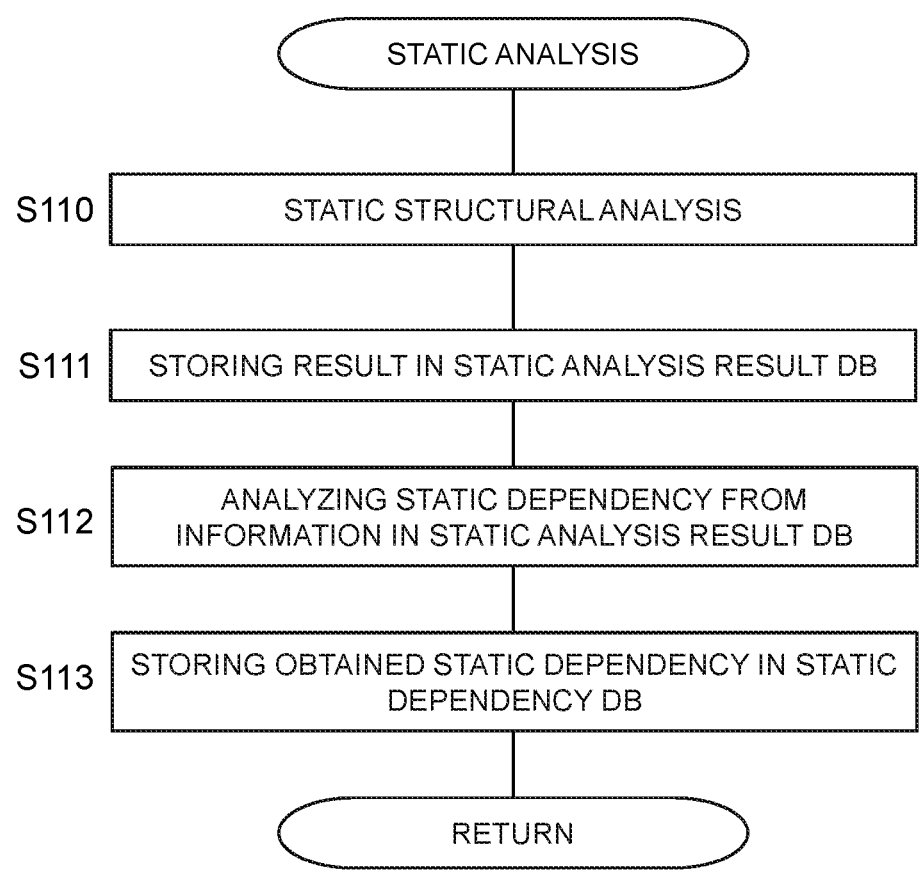
FIG. 3 is a flowchart showing a detailed flow of a static analysis step shown in FIG. 2.

FIG. 3 is a flowchart showing a detailed flow of the static analysis step S102 shown in FIG. 2. First, the static analyzing unit 2 performs static structural analysis of the source code 20 (S110). Next, the static analysis result output from the static analyzing unit 2 is stored in the static analysis result database 3 (S111).

FIG. 4*a* is a view showing an example of the source code 20. FIG. 4*b* is a table showing an example of the static analysis result database 3. In the static structural analysis of step S110, a syntax, a structure, and the like of the source code 20 are analyzed without execution of the source code 20 (statically), and the static analysis result shown in FIG. 4*b* is obtained. FIG. 4*b* is a function list that enumerates functions described in the source code 20, and includes information about a call destination function that is being called by a listed function. A "function" column in FIG. 4*b* enumerates functions contained in the source code 20. A "call destination function" column in FIG. 4*b* shows functions that are being called by functions shown in the "function" column.

For example, a row of No. 1 in FIG. 4b shows that, in the source code 20, a test1 function, a test2 function, and a test3 function are called in a main function. Next, when looking at a row of No. 5, it can be seen that a func function is called from the test3 function.

However, there is a limit to the dependency analysis between software components through static analysis. For example, in the source code shown in FIG. 4a, an address of the func function is assigned to a function pointer pf in the test1 function, while the function pointer pf is called in the test2 function. However, as shown in the static analysis result database 3 in FIG. 4b, in static analysis, it cannot be analyzed that the func function, which is an address destination of the function pointer pf, is called from the test2 function. The fact that the func function, which is the address destination of the function pointer pf, is called from the test2 function is analyzed by dynamic analysis described later.

Returning to FIG. 3, after step S111, the static dependency analyzing unit 4 analyzes the static analysis result stored in the static analysis result database 3 (S112), and organizes dependency between software components, to store in the static dependency database 5 (S113). FIG. 4c is a table showing an example of the static dependency database 5. For example, a row of No. 1 in FIG. 4c shows that the main function depends on the test1 function. Therefore, when looking at the row of No. 1 in FIG. 4c, it can be seen that, when a change occurs in the test1 function, influence of the change also affects the main function.

[2-2. Dynamic Analysis]

Figure 5:
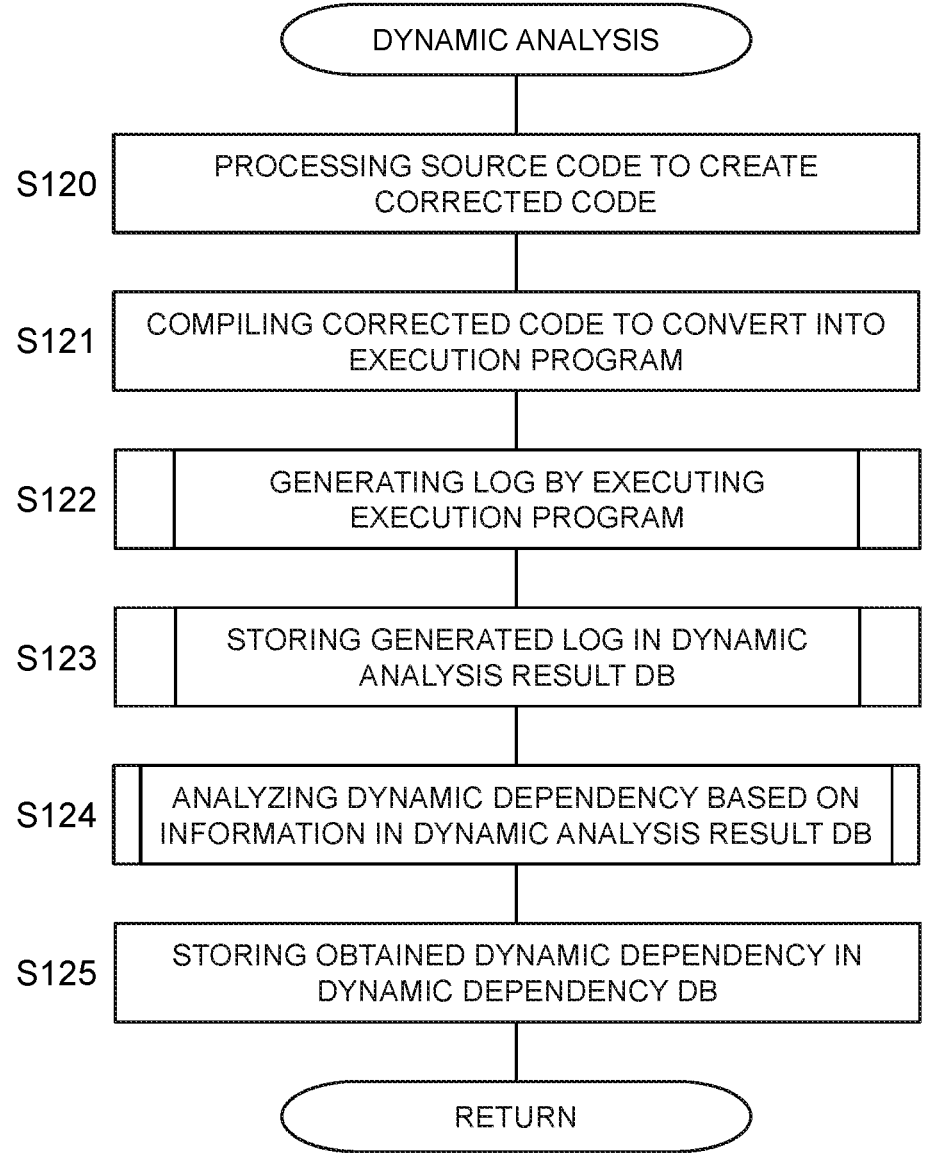
FIG. 5 is a flowchart showing a detailed flow of a dynamic analysis step shown in FIG. 2.

FIG. 5 is a flowchart showing a detailed flow of the dynamic analysis step S103 shown in FIG. 2. First, the code processing unit 6 processes the source code 20 so that a log can be acquired, and creates a corrected code 21 as shown in FIG. 6 (S120). The corrected code 21 is obtained by, for example, inserting a function called [function name] IN (for example, func IN) at the beginning of a function described in the source code 20, and inserting [Function name] OUT (for example, func OUT) at the end of the function.

Next, the compiling unit 7 compiles the corrected code 21, and converts into an execution program in an executable format (S121). The execution unit 8 executes the execution program. At the time of the execution, for example, a test case is given to the execution program. Here, the test case is input data for realizing a specific function of the program. The test case may be input externally by a user or a developer. Alternatively, the test case may be stored in advance in a storage device (not shown) such as a flash memory, an HDD, or an SSD provided in the analysis device 100. When the execution program is executed, the dynamic analyzing unit 9 monitors processing of the execution program, and generates a log such as an execution log and an access log (S122).

Figure 7:
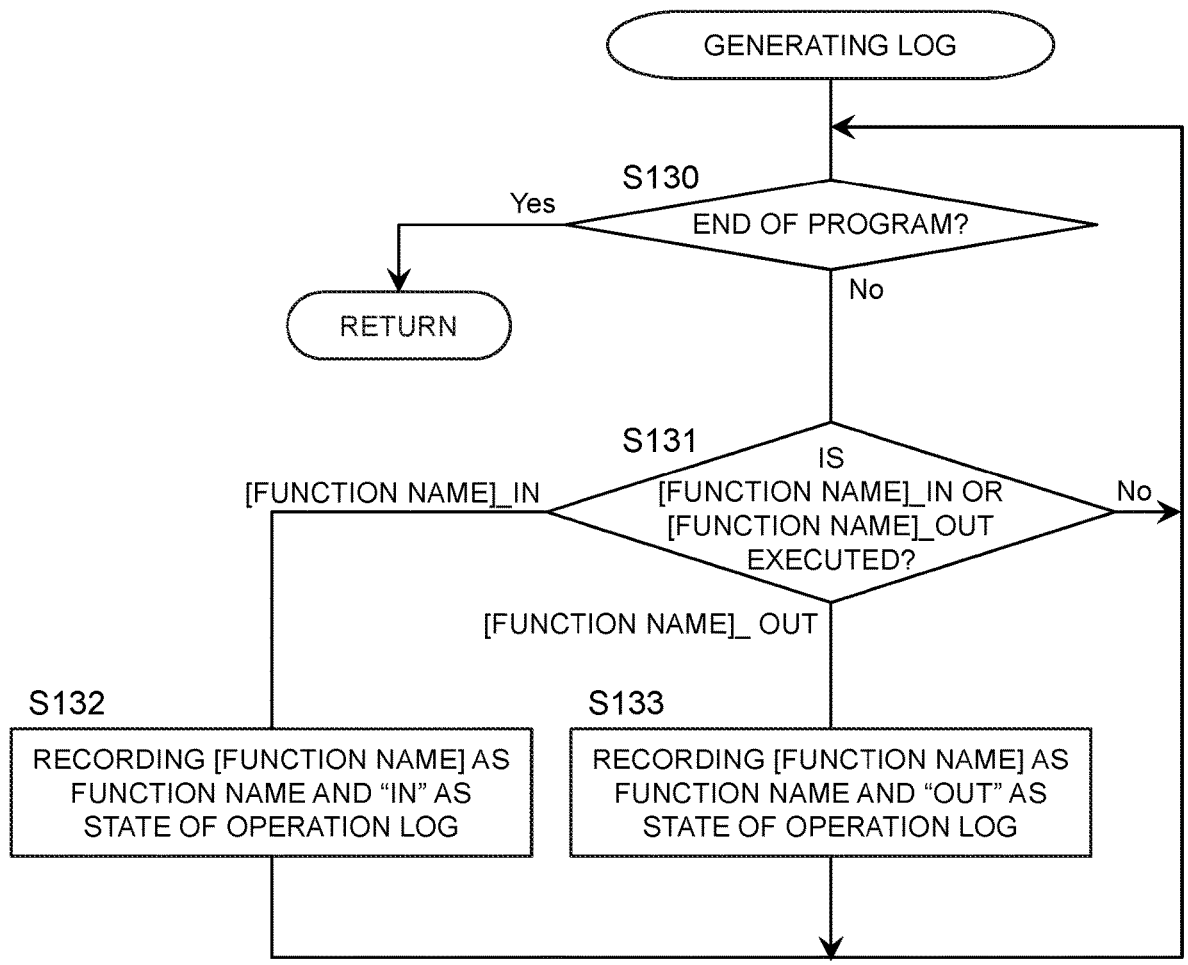
FIG. 7 is a flowchart showing a detailed flow of a step of generating a log.

FIG. 7 is a flowchart showing a detailed flow of step S122 of generating a log. In step S122 of generating a log, first, the dynamic analyzing unit 9 determines whether or not execution of the execution program has been finished (S130). When it is determined that the execution of the execution program has not been finished, the dynamic analyzing unit 9 monitors whether or not the [function name] IN function or the [function name] OUT function of the corrected code 21 (actually, the execution program after compiling of the corrected code 21) has been executed (S131). When neither has been executed, the process returns to step S130.

When the [function name] IN function has been executed in step S131, [function name] is recorded in a "function name" field and IN is recorded in a "state" field of an operation log 22 as shown in FIG. 8 (S132). For example, in the example shown in FIG. 8, since a main IN function has been executed first (execution order 1), main is recorded in the "function name" field of the operation log 22, and IN is recorded in the "state" field. After the recording, the process returns to step S130.

When the [function name] OUT function has been executed in step S131, [function name] is recorded in the "function name" field and OUT is recorded in the "state" field of the operation log 22 (S133). After the recording, the process returns to step S130.

By repeating the above steps S130 to S133, the operation log 22 as shown in FIG. 8 is generated. When an end of the execution program is detected in step S130, step S122 of generating a log is finished, and the process proceeds to step S123 shown in FIG. 5.

Returning to FIG. 5, the operation log 22 generated in step S122 is stored in the dynamic analysis result database 10 (S123). The dynamic dependency analyzing unit 11 analyzes dynamic dependency between software components, from information such as the operation log 22 stored in the dynamic analysis result database 10 (S124).

Figure 9:
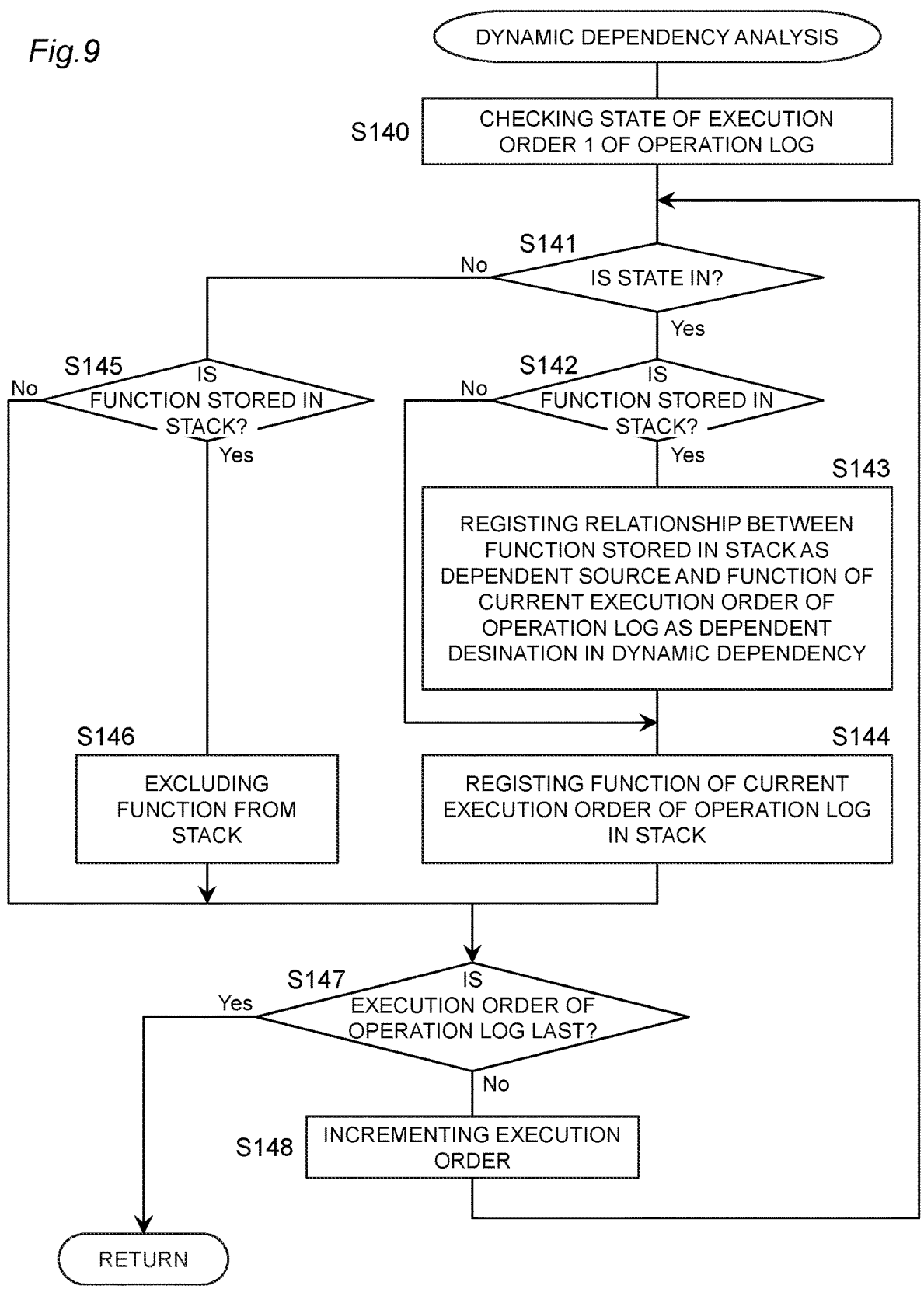
FIG. 9 is a flowchart showing a detailed flow of a step of analyzing dynamic dependency.

FIG. 9 is a flowchart showing a detailed flow of step S124 of analyzing dynamic dependency. First, the dynamic dependency analyzing unit 11 checks a content of the "state" field of execution order 1 of the operation log 22 (see FIG. 8) (S140, S141). When it is determined that IN is recorded in the "state" field of the operation log 22, the dynamic dependency analyzing unit 11 determines whether or not a function is stored in a dynamic dependency analysis stack 23 (hereinafter, referred to as a "first stack") (S142). In the example shown in FIG. 8, since IN is recorded in the "state" field of execution order 1, it is determined whether or not a function is stored in the first stack 23.

A stack such as the first stack is realized by using, for example, a volatile memory such as an SRAM or a DRAM that temporarily stores various kinds of information.

FIG. 10 is a table showing an example of the first stack 23. At a time of step S142 for execution order 1, no function is stored in the first stack 23 (see a row above the row of execution order 1 in FIG. 10). In step S142, when no function is stored in the first stack 23, a function of the current execution order of the operation log 22 is registered (pushed) in the first stack 23 (S144). In the illustrated example, a function executed in execution order 1 is the main function (see FIG. 8). Therefore, the main function is pushed to execution order 1 of the first stack 23 shown in FIG. 10. In this way, the first stack 23 is in a state shown in the row of execution order 1 in FIG. 10.

Returning to the description of the flowchart of FIG. 9, in step S142, when a function is stored in the first stack 23, the dynamic dependency analyzing unit 11 registers dependency in dynamic dependency, with the function stored in the first stack 23 as a dependent source and the function of the current execution order of the operation log 22 as a dependent destination (S143). As shown in FIG. 9, step S144 is also executed after step S143.

After step S144, the dynamic dependency analyzing unit 11 determines whether or not the execution order of the operation log 22 is the last (S147). When it is the last, step S124 of analyzing the dynamic dependency is finished, and the process proceeds to step S125 shown in FIG. 5. When it is not the last, the execution order is incremented (S148), and the process returns to step S141.

In the above, a case where IN is recorded in the "state" field of the operation log 22, that is, a case where a determination result in step S141 is Yes has been described. Next, a case where IN is not recorded in the "state" field of the operation log 22, that is, a case where a determination result in step S141 is No will be described. In this case, OUT is recorded in the "state" field of the operation log 22. In this case, similarly to step S142, it is determined whether or not a function is stored in the first stack 23 (S145).

In step S145, when a function is stored in the first stack 23, the dynamic dependency analyzing unit 11 excludes (pops) the function from the first stack 23 (S146). When no function is stored in the first stack 23 in step S145, the process proceeds to step S147. After step S146 is executed, the process also proceeds to step S147.

In this way, the execution order is incremented until the last execution order. Then, after the determination in step S147 is Yes, all functions are popped from the first stack 23 (see a row of execution order 12 in FIG. 10), and dynamic dependency as shown in FIG. 11 is obtained. Then, the process proceeds to step S125 shown in FIG. 5, and the dynamic dependency as shown in FIG. 11 is stored in the dynamic dependency database 12.

[2-3. Comprehensive Dependency Analysis]

Figure 12:
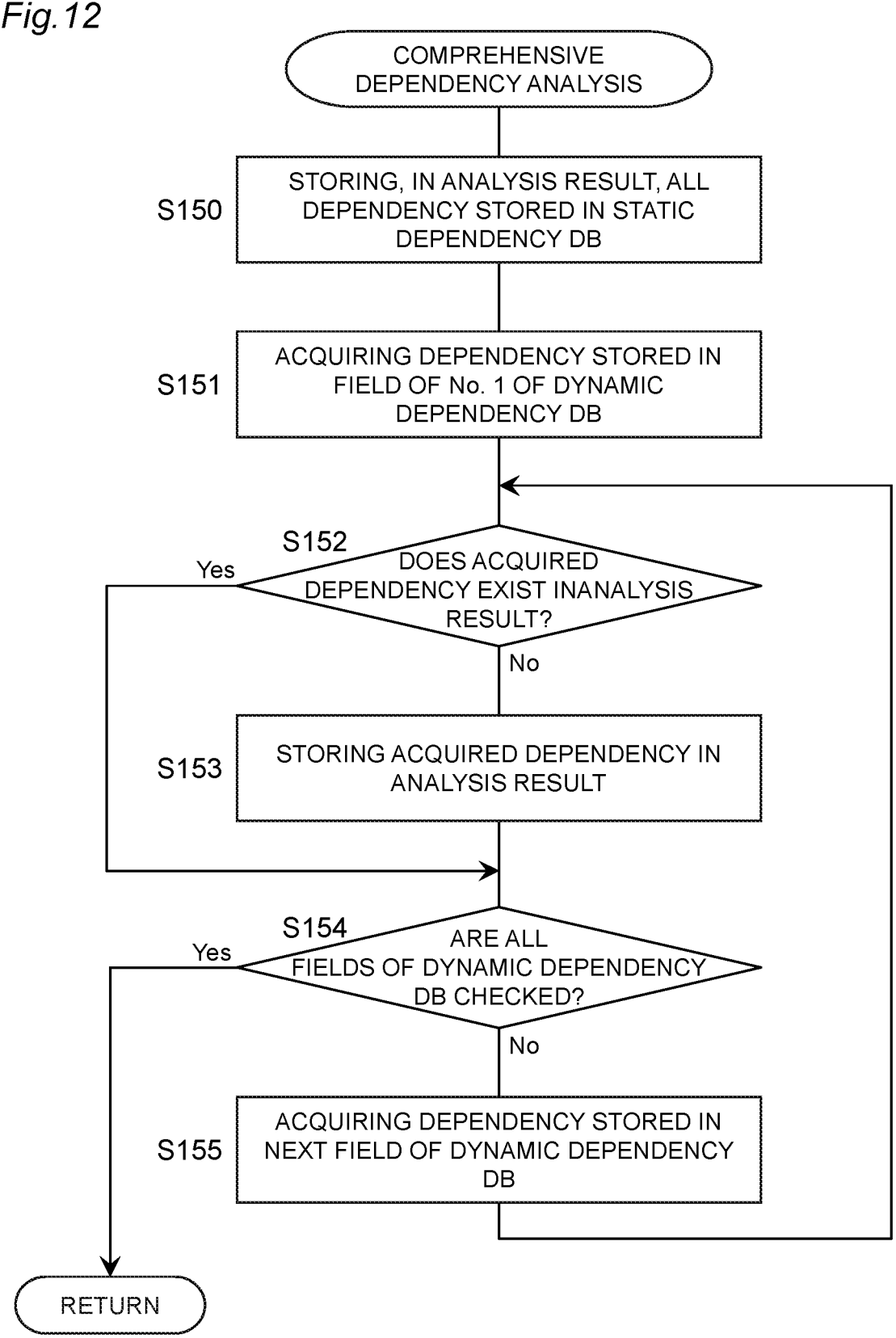
FIG. 12 is a flowchart showing a detailed flow of a step of analyzing comprehensive dependency, shown in FIG. 2.

FIG. 12 is a flowchart showing a detailed flow of step S104 of analyzing comprehensive dependency, shown in FIG. 2. In step S104, dependency that integrates information stored in the static dependency database 5 and information stored in the dynamic dependency database 12 is obtained. First, the comprehensive dependency analyzing unit 13 stores, in the analysis result 14, all the dependency stored in the static dependency database 5 as shown in FIG. 4c (S150).

Next, the comprehensive dependency analyzing unit 13 acquires dependency stored in a row of No. 1 of the dynamic dependency database 12 as shown in FIG. 11 (S151). In the example shown in FIG. 11, the row of No. 1 in the dynamic dependency database 12 stores dependency with the main function as a dependent source and the test1 function as a dependent destination.

Next, the comprehensive dependency analyzing unit 13 determines whether or not the acquired dependency exists in the analysis result 14 (S152). When it is determined that the acquired dependency does not exist, the comprehensive dependency analyzing unit 13 stores the acquired dependency in the analysis result 14 (S153), and the process proceeds to the next step S154. When it is determined in step S152 that the acquired dependency exists in the analysis result 14, the process also proceeds to step S154.

In step S154, the comprehensive dependency analyzing unit 13 determines whether or not dependency of all the rows in the dynamic dependency database 12 has been checked. When the dependency of all the rows has not been checked, the comprehensive dependency analyzing unit 13 acquires dependency stored in the next row of the dynamic dependency database 12 (S155). Then, the process returns to step S152.

When it is determined in step S154 that the dependency of all the rows in the dynamic dependency database 12 has been checked, step S104 of analyzing comprehensive dependency is finished, and the process proceeds to step S105 shown in FIG. 2.

FIG. 13 is a table showing an example of the analysis result 14 after step S104 of analyzing comprehensive dependency is finished. As compared with the static dependency database 5 shown in FIG. 4c, dependency of the row of No. 4 is added to the analysis result 14 of FIG. 13. By static analysis, it cannot be analyzed that the func function, which is an address destination of the function pointer pf, is called from the test2 function, but can be analyzed by dynamic analysis. Therefore, the analysis result 14 is added with dependency that is not in the static dependency database 5.

[3. Effects and Others]

As described above, the analysis device 100 includes: the static analyzing unit 2 that statically analyzes a structure of the source code 20 of software; and the static dependency analyzing unit 4 that analyzes dependency between objects of the software based on a static analysis result; and the dynamic dependency analyzing unit 11 that executes a program indicated by the source code 20, acquires the operation log 22, and analyzes dependency between objects based on the operation log 22. The analysis device 100 analyzes dependency between objects based on an analysis result of the static dependency analyzing unit 4 and an analysis result of the dynamic dependency analyzing unit 11.

The analysis device 100 can analyze dependency between functions via a pointer reference, which has been unable to be analyzed by static analysis, by using the analysis result by the dynamic dependency analyzing unit 11. In this way, by combining dynamic analysis and static analysis, the analysis device 100 can analyze dependency between software components more comprehensively than the conventional technology.

Second Embodiment

Figure 14:
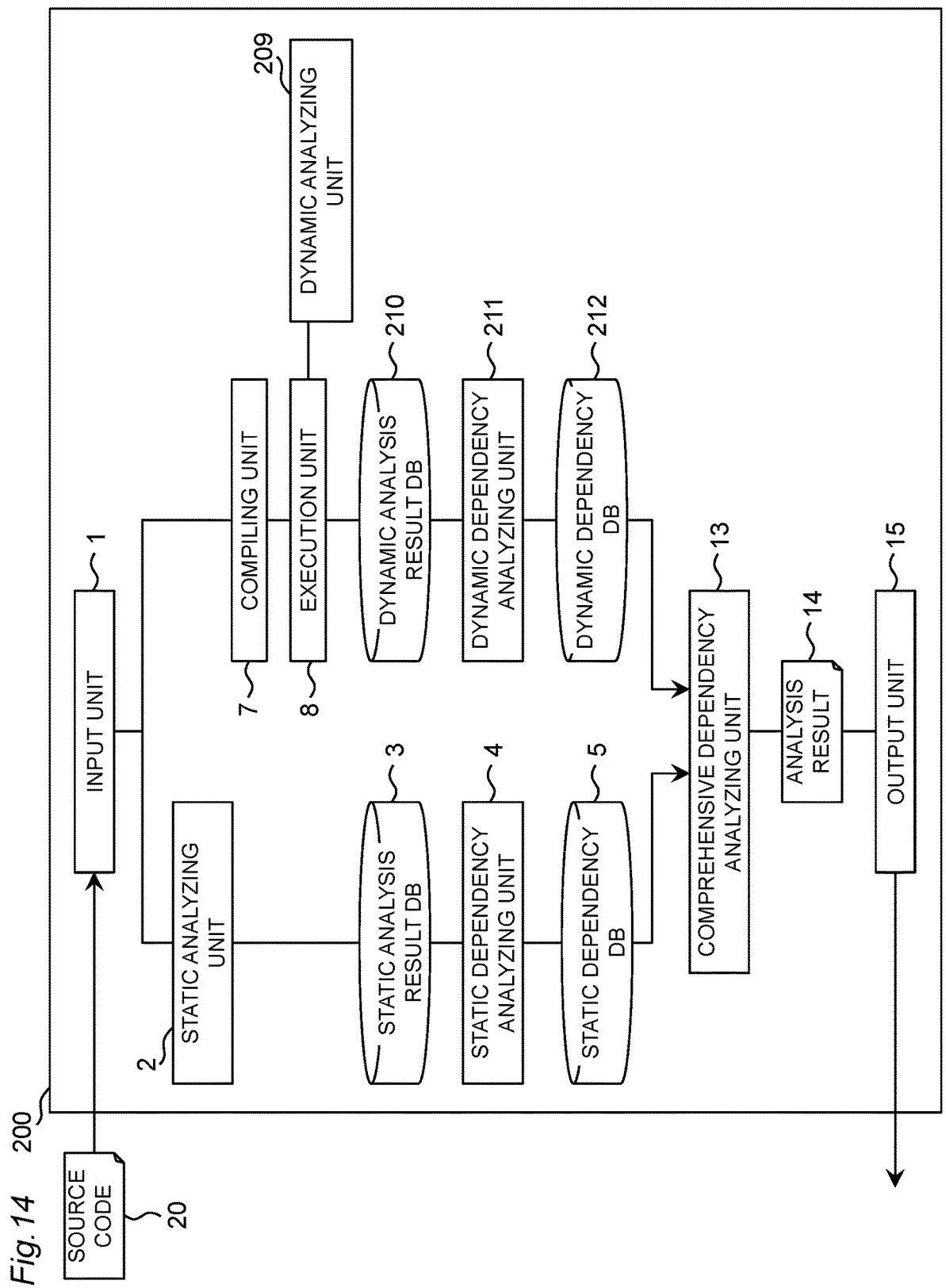
FIG. 14 is a block diagram showing a configuration of an analysis device according to a second embodiment of the present invention.

FIG. 14 is a block diagram showing a configuration of an analysis device 200 according to a second embodiment of the present invention. As compared with the analysis device 100 of the first embodiment, the analysis device 200 is not provided with the code processing unit 6. In addition, individual functions or operations of a dynamic analyzing unit 209, a dynamic analysis result database 210, and a dynamic dependency analyzing unit 211 of the analysis device 200 are different from the case of the first embodiment.

In the second embodiment, dynamic analysis of a source code 20 is performed by analyzing message passing transmitted and received between tasks. The message passing is one of communication methods between objects, and is one of means for sharing information between tasks in a software program in which multiple tasks are executed in parallel.

Figure 15:
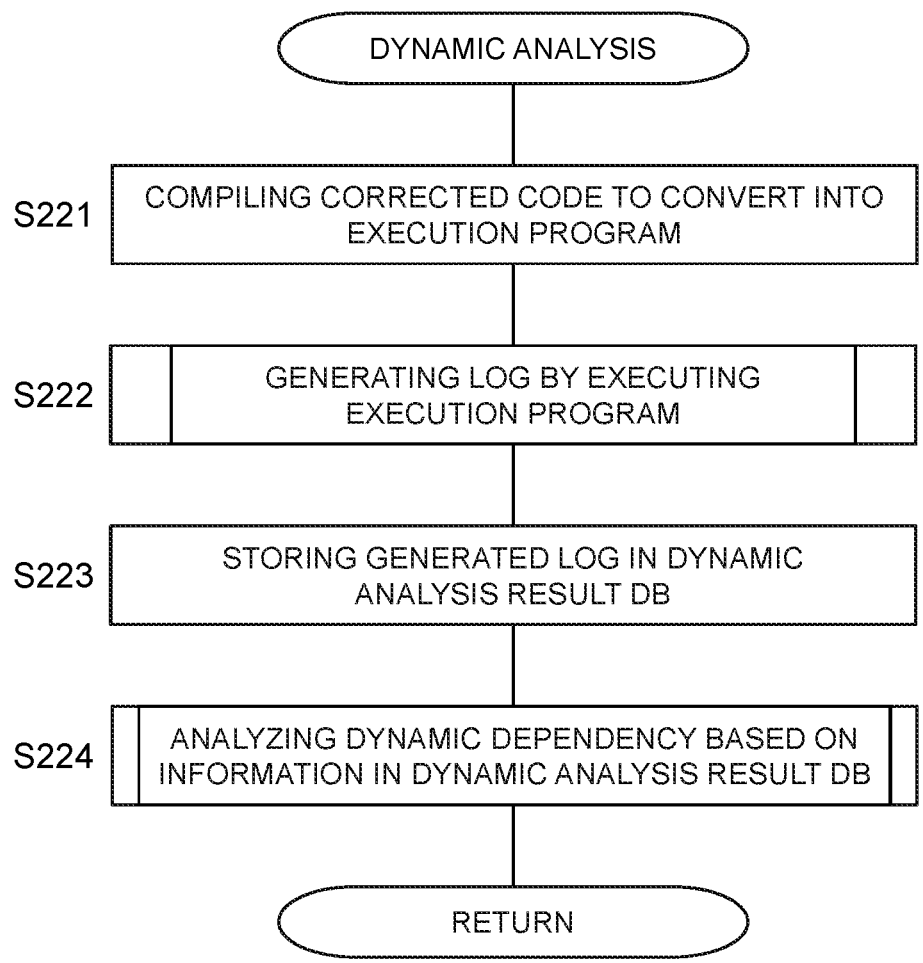
FIG. 15 is a flowchart showing a flow of dynamic analysis in the second embodiment.

An operation flow of the analysis device 200 is similar to the flow shown in the flowchart of FIG. 2 of the first embodiment, but only a content of a dynamic analysis step (S103 in FIG. 2) is different. FIG. 15 is a flowchart showing a flow of dynamic analysis in the second embodiment. As compared with the flowchart of FIG. 5 of the first embodiment, FIG. 15 does not have a step of creating a corrected code and a step of storing dynamic dependency in a dynamic dependency database. In the second embodiment, an operation of storing the dynamic dependency in the dynamic dependency database is included in step S224 described later.

Figure 16:
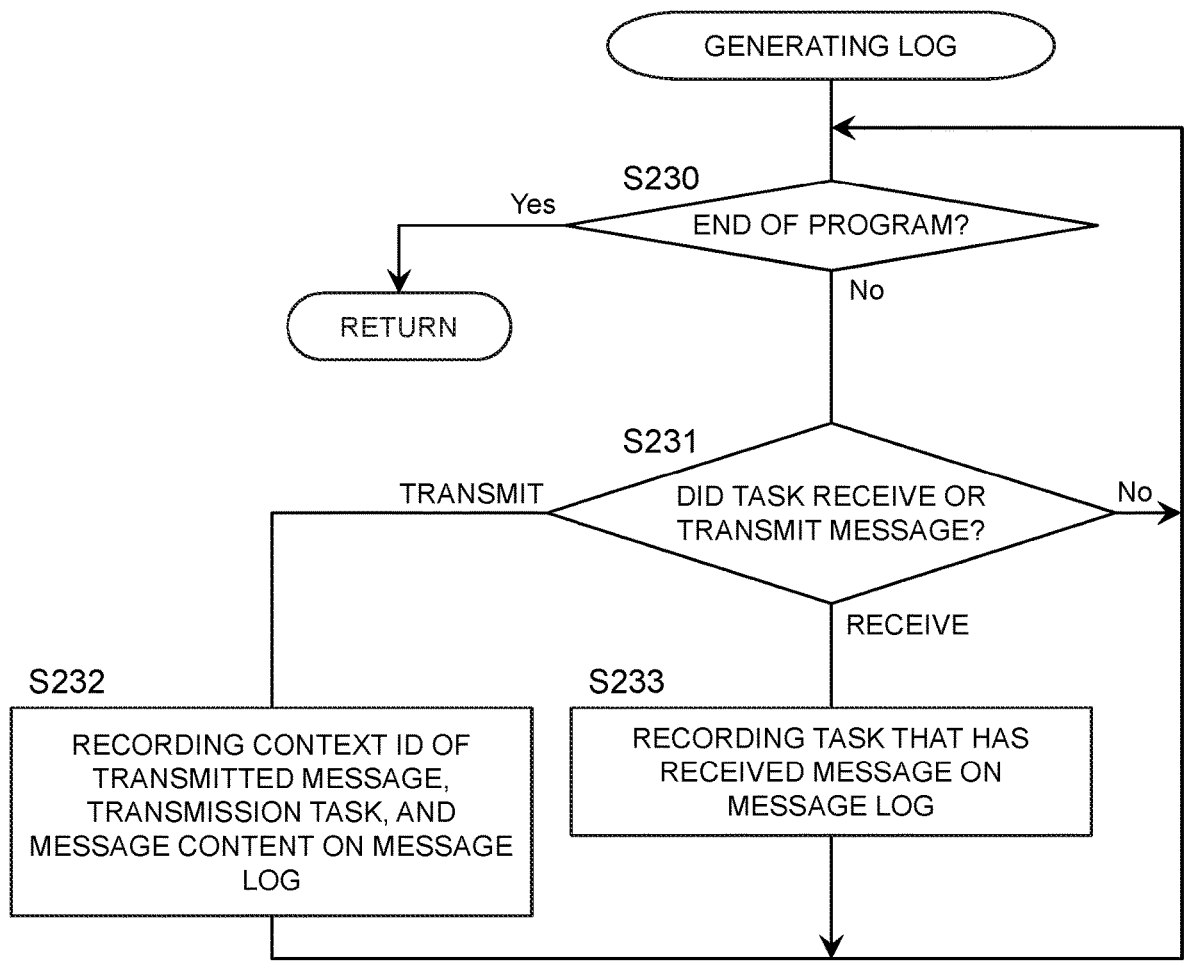
FIG. 16 is a flowchart showing a detailed flow of a step of generating a log of FIG. 15.

FIG. 16 is a flowchart showing a detailed flow of step S222 of generating the log of FIG. 15. First, the dynamic analyzing unit 209 determines whether or not execution of an execution program has been finished (S230). When it is determined that the execution of the execution program has not been finished, the dynamic analyzing unit 209 monitors whether or not a task has received or transmitted a message (S231). When neither received nor transmitted, the process returns to step S230.

When it is confirmed that the task has transmitted the message in step S231, the dynamic analyzing unit 209 records, in a message log 222 as shown in FIG. 17, a context ID of the transmitted message, a message content, and a task that has transmitted the message (S232). For example, when task A transmits a message identified by the context ID=0x0001, as shown in the top row of the message log 222 of FIG. 17, values as exemplified are recorded in a "context ID" field, a "message content" field, and a "transmission task" field. After the recording, the process returns to step S230.

When it is determined in step S231 that a task has received a message, the dynamic analyzing unit 209 records a task that has received the message, in the message log 222 (S233). For example, when task X receives this message in the example where task A has transmitted the message identified by the context ID=0x0001, the dynamic analyzing unit 209 records task X in a "reception task" field as shown in the top row of the message log 222 in FIG. 17. After the recording, the process returns to step S230.

By repeating the above steps S230 to S233, the message log 222 as shown in FIG. 17 is generated. When an end of the execution program is detected in step S230, step S222 of generating a log is finished, and the process proceeds to step S223 shown in FIG. 15.

The message log 222 generated in step S222 is stored in the dynamic analysis result database 210 (S223). The dynamic dependency analyzing unit 211 analyzes dynamic dependency between software components, from information such as the message log 222 stored in the dynamic analysis result database 210 (S224).

Figures 18, 19:
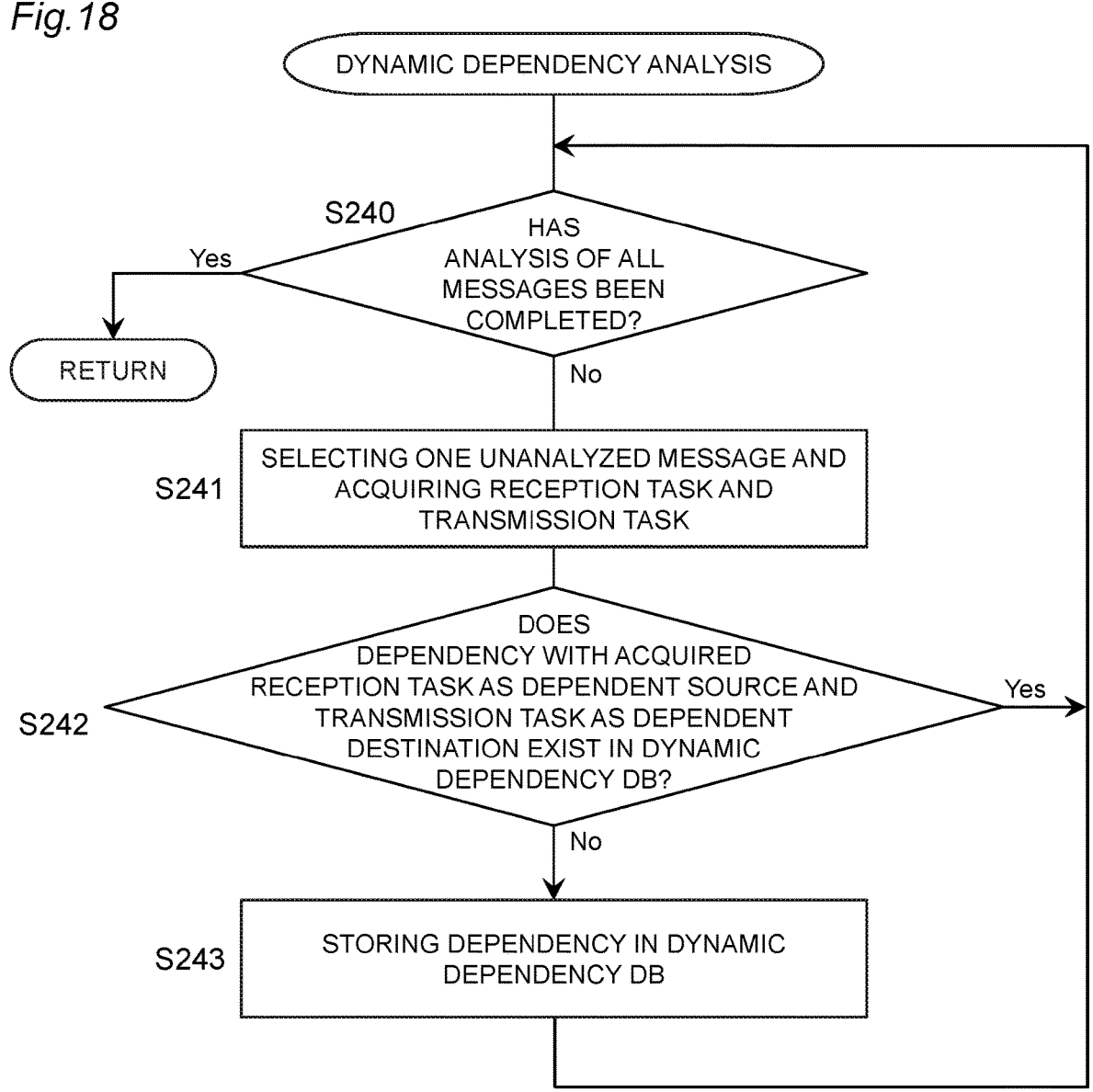
FIG. 18 is a flowchart showing a detailed flow of a step of analyzing dynamic dependency.
FIG. 19 is a table showing an example of a dynamic dependency database.

FIG. 18 is a flowchart showing a detailed flow of step S224 of analyzing dynamic dependency. First, the dynamic dependency analyzing unit 211 determines whether or not analysis of all the messages in the message log 222 stored in the dynamic analysis result database 210 has been finished (S240). When the analysis has not been finished, the dynamic dependency analyzing unit 211 selects one unanalyzed message, and acquires a record of the "reception task" field and a record of the "transmission task" field identified by the context ID (S241).

Next, the dynamic dependency analyzing unit 211 checks whether or not dependency with the acquired reception task as a dependent source and the transmission task as a dependent destination is stored in a dynamic dependency database 212 (S242). When the dependency is stored, the process returns to step S240. When the dependency is not stored, the dependency with the acquired reception task as a dependent source and the transmission task as a dependent destination is stored in the dynamic dependency database 212 (S243).

When it is determined in S240 that the analysis of all the messages has been finished, step S224 of analyzing the dynamic dependency is finished. In this way, the dynamic dependency database 212 as shown in FIG. 19 is obtained.

As described above, in the analysis device 200, the dynamic dependency analyzing unit 211 generates an analysis result showing that there is dependency between the task that has transmitted the message and the task that has received the message. The dynamic dependency analyzing unit 211 performs dynamic analysis based on this analysis result, and the analysis device 200 analyzes dependency between tasks based on an analysis result of the static dependency analyzing unit 4 and an analysis result of the dynamic dependency analyzing unit 211.

Which task receives and processes message passing transmitted from a certain task cannot be grasped unless the program is executed and operated, and cannot be seen just by statically analyzing a structure of the source code. The analysis device 200 can analyze dependency between functions via message passing, which has been unable to be analyzed by static analysis, by using an analysis result by the dynamic dependency analyzing unit 211. In this way, by combining dynamic analysis and static analysis, the analysis device 200 can analyze dependency between software components more comprehensively than the conventional technology.

Third Embodiment

Figure 20:
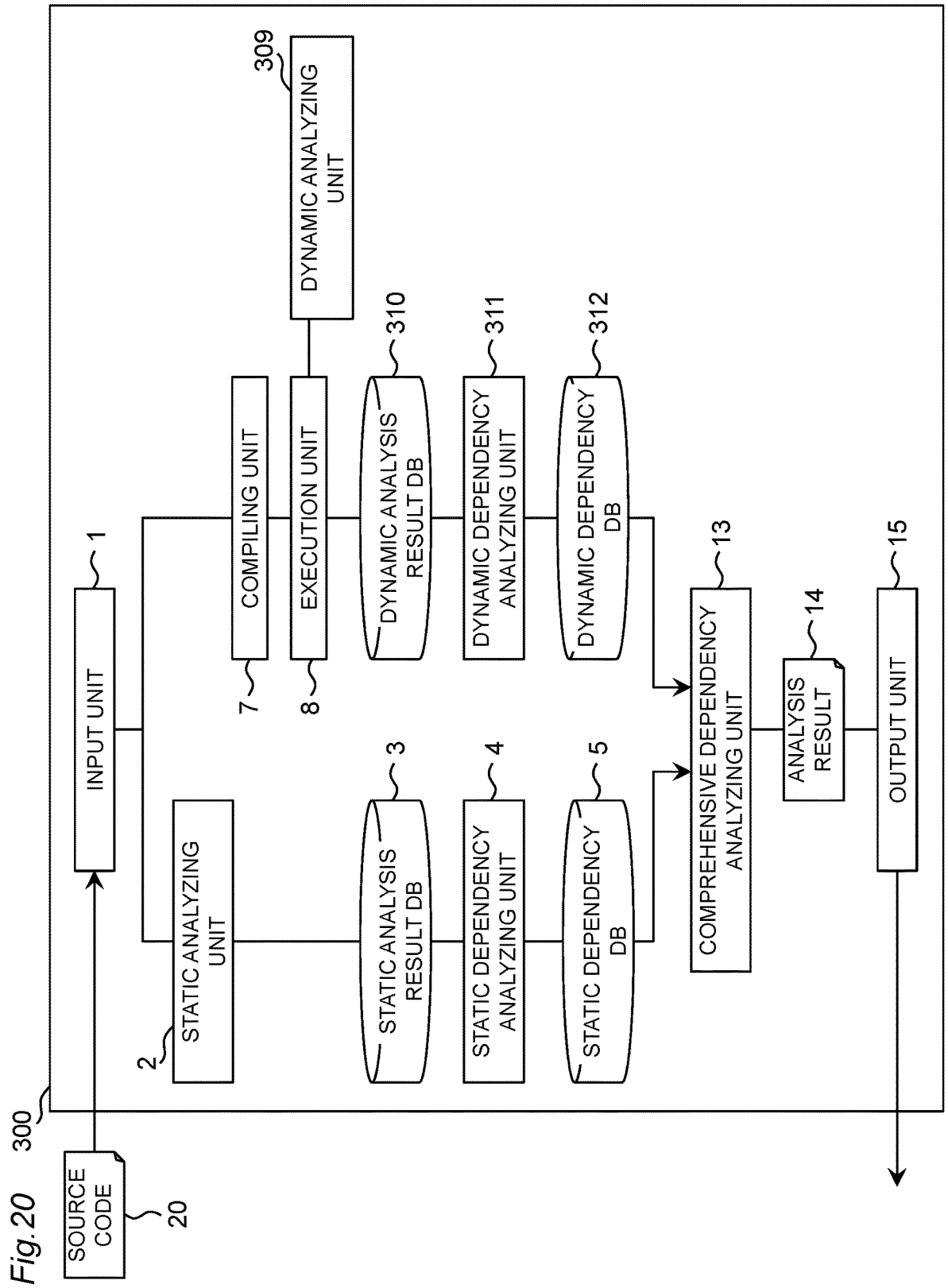
FIG. 20 is a block diagram showing a configuration of an analysis device according to a third embodiment of the present invention.

FIG. 20 is a block diagram showing a configuration of an analysis device 300 according to a third embodiment of the present invention. As compared with the analysis device 100 of the first embodiment, individual functions or operations of a dynamic analyzing unit 309, a dynamic analysis result database 310, and a dynamic dependency analyzing unit 311 of the analysis device 300 are different from the dynamic analyzing unit 9, the dynamic analysis result database 10, and the dynamic dependency analyzing unit 11 of the first embodiment.

In the third embodiment, the analysis device 300 analyzes an operation between objects that transfer data via a shared memory. The shared memory is configured by a volatile memory such as an SRAM or a DRAM that temporarily stores various kinds of information, for example.

Figure 21:
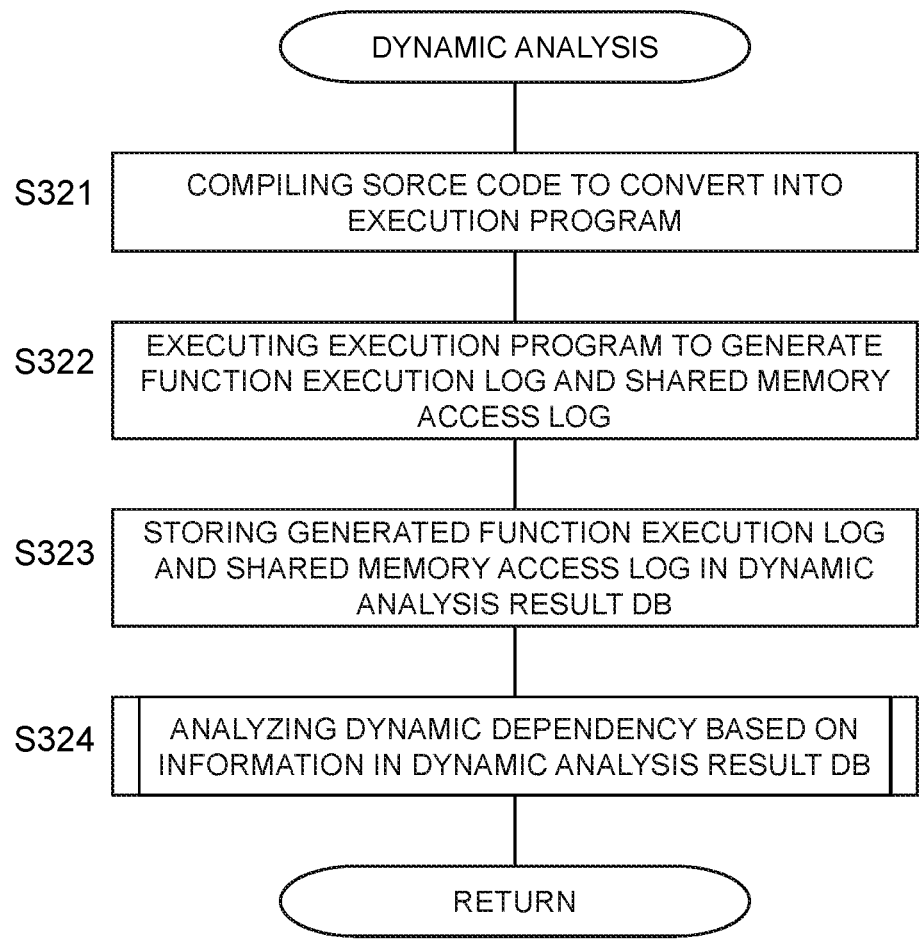
FIG. 21 is a flowchart showing a flow of dynamic analysis in the third embodiment.

An operation flow of the analysis device 300 is similar to the flow shown in the flowchart of FIG. 2 of the first embodiment, but only a content of a dynamic analysis step (S103 in FIG. 2) is different. FIG. 21 is a flowchart showing a flow of dynamic analysis in the third embodiment. The flow of the dynamic analysis will be described with reference to FIGS. 20 and 21.

First, a compiling unit 7 compiles a source code 320, and converts into an execution program in an executable format (S321). FIG. 22 is a view showing an example of the source code 320. In the source code 320, a shared memory is used. In the source code 320, a structure Point is declared globally, and an entity is declared in a main function. When a PrintPoint function is executed from within the main function, an address is passed as an argument of the PrintPoint function. In the PrintPoint function, a process of reading a value of the passed address destination is performed. FIG. 23 is a view showing an address list 321 of the shared memory used in the source code 320.

Next, an execution unit 8 executes the execution program. At this time, the dynamic analyzing unit 309 monitors processing of the execution program, and generates a function execution log 322 as shown in FIG. 24 and a shared memory access log 323 as shown in FIG. 25 (S322).

In the function execution log 322, a start time and an end time of function processing are recorded. In the example shown in FIG. 24, it can be seen that the main function has been executed from time 00:00 to time 00:05, and the PrintPoint function has been executed from time 00:05 to time 00:20.

In the shared memory access log 323, an access destination address and an access time are recorded. The dynamic analyzing unit 309 analyzes an address secured when the shared memory is declared, and acquires an access destination address and an access time. The dynamic analyzing unit 309 records, in the shared memory access log 323, the access destination address and the access time when the shared memory is accessed. In the example shown in FIG. 25, it can be seen that the times when the address 0x0000 has been accessed are 00:01 and 00:06.

Returning to FIG. 21, the generated function execution log 322 and shared memory access log 323 are stored in the dynamic analysis result database 310 (S323). The dynamic dependency analyzing unit 311 analyzes dynamic dependency between software components, from the function execution log 322 and the shared memory access log 323 stored in the dynamic analysis result database 310 (S324).

Figure 26:
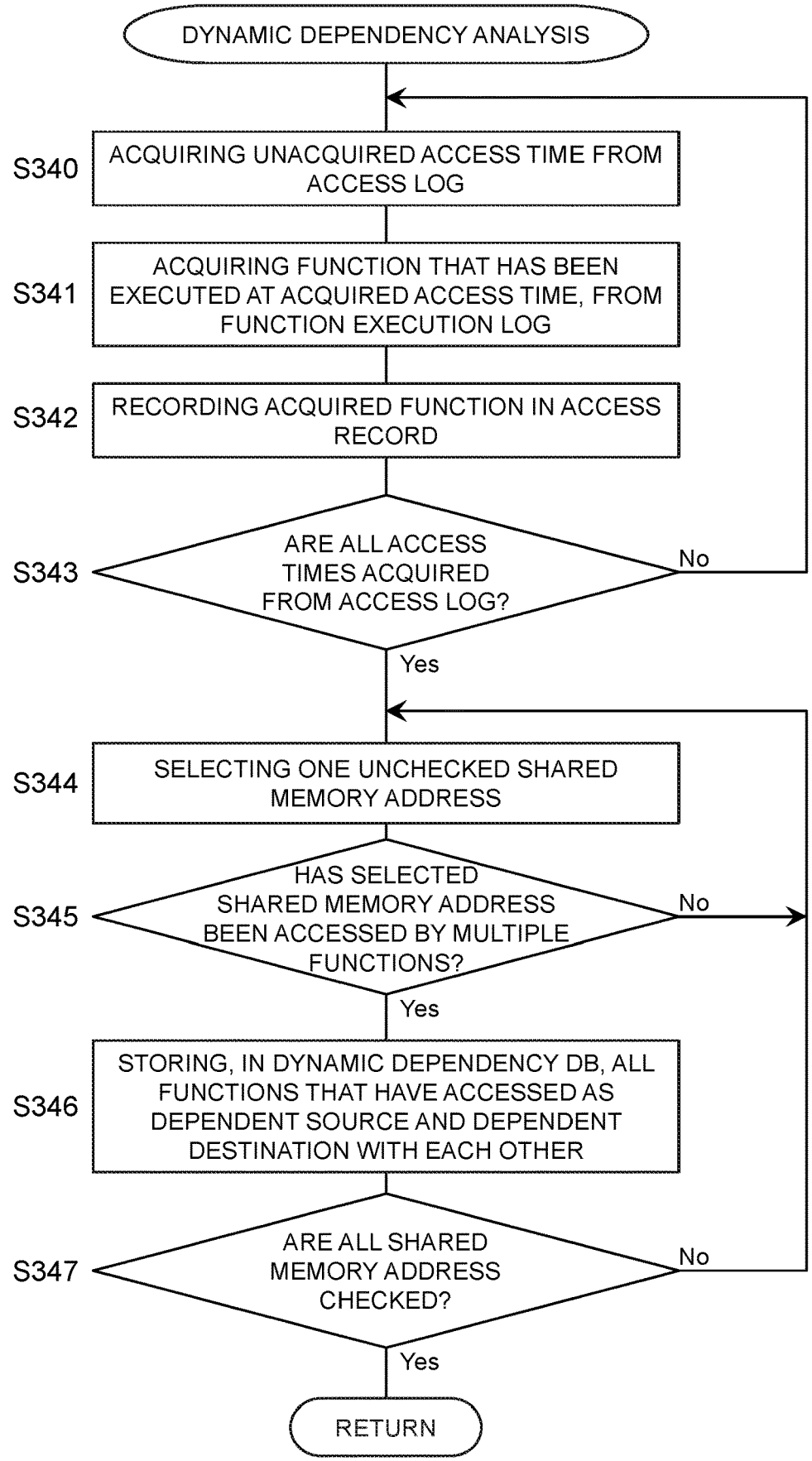
FIG. 26 is a flowchart showing a detailed flow of a step of analyzing dynamic dependency.

FIG. 26 is a flowchart showing a detailed flow of step S324 of analyzing dynamic dependency. First, the dynamic dependency analyzing unit 311 acquires an access time from the shared memory access log 323 (S340). For example, in the example shown in FIG. 25, the access time 00:01 is acquired. Other access times are acquired after a later loop, but the acquired time (for example, 00:01) is not acquired at that time.

Returning to FIG. 26, the dynamic dependency analyzing unit 311 acquires a function that has been executed at the access time acquired in step S340, from the function execution log 322 (S341). In the previous example, the acquired access time has been 00:01. Referring to FIG. 24, the function that has been executed at the access time 00:01 is the main function. Therefore, the dynamic dependency analyzing unit 311 acquires the main function from the function execution log 322.

Next, the dynamic dependency analyzing unit 311 records, in a shared memory access record 324 as shown in FIG. 27, the function acquired in step S341, as the function that has been accessing the shared memory address at the access time (S342).

Next, the dynamic dependency analyzing unit 311 determines whether or not all the access times of the shared memory access log 323 have been acquired (S343). When it is determined that all the access times have not been acquired, the process returns to step S340. When it is determined that all the access times have been acquired, the process proceeds to step S344. When all the access times of the shared memory access log 323 are acquired, the shared memory access record 324 as shown in FIG. 27 is completed.

Next, the dynamic dependency analyzing unit 311 selects an unchecked one of the shared memory addresses recorded in the shared memory access record 324 (S344). The dynamic dependency analyzing unit 311 checks the shared memory access record 324, and determines whether or not the selected shared memory address has been accessed by multiple functions (S345).

For example, in the example shown in FIG. 27, when the shared memory address 0x0000 is selected in step S344, it can be determined that the selected shared memory address 0x0000 has been accessed by multiple functions of the main function and the PrintPoint function.

When it is determined in step S345 that there has been access from multiple functions, all the functions that have accessed are combined as a dependent source and a dependent destination with each other and stored in a dynamic dependency database 312 (S346). In the previous example, the functions that have accessed the shared memory address 0x0000 are the main function and the PrintPoint function. Therefore, in the dynamic dependency database 312, dependency No. 1 with the PrintPoint function as a dependent source and the main function as a dependent destination, and dependency No. 2 with the main function as a dependent source and the PrintPoint function as a dependent destination are stored. In this way, the dynamic dependency database 312 as shown in FIG. 28 is obtained.

As described above, the analysis device 300 uses the shared memory. The dynamic dependency analyzing unit 311 analyzes dependency between functions based on an address of a shared memory accessed by a program indicated by the source code 320 and a time of access.

Conventionally, when a value of a shared memory is rewritten by a function to which an address is passed by function call, dependency through the address has been unable to be analyzed by static analysis. The analysis device 300 can analyze dependency between functions via a shared memory, which has been unable to be analyzed by static analysis. In this way, by combining dynamic analysis and static analysis, the analysis device 300 can analyze dependency between software components more comprehensively than the conventional technology.

Fourth Embodiment

Figure 29:
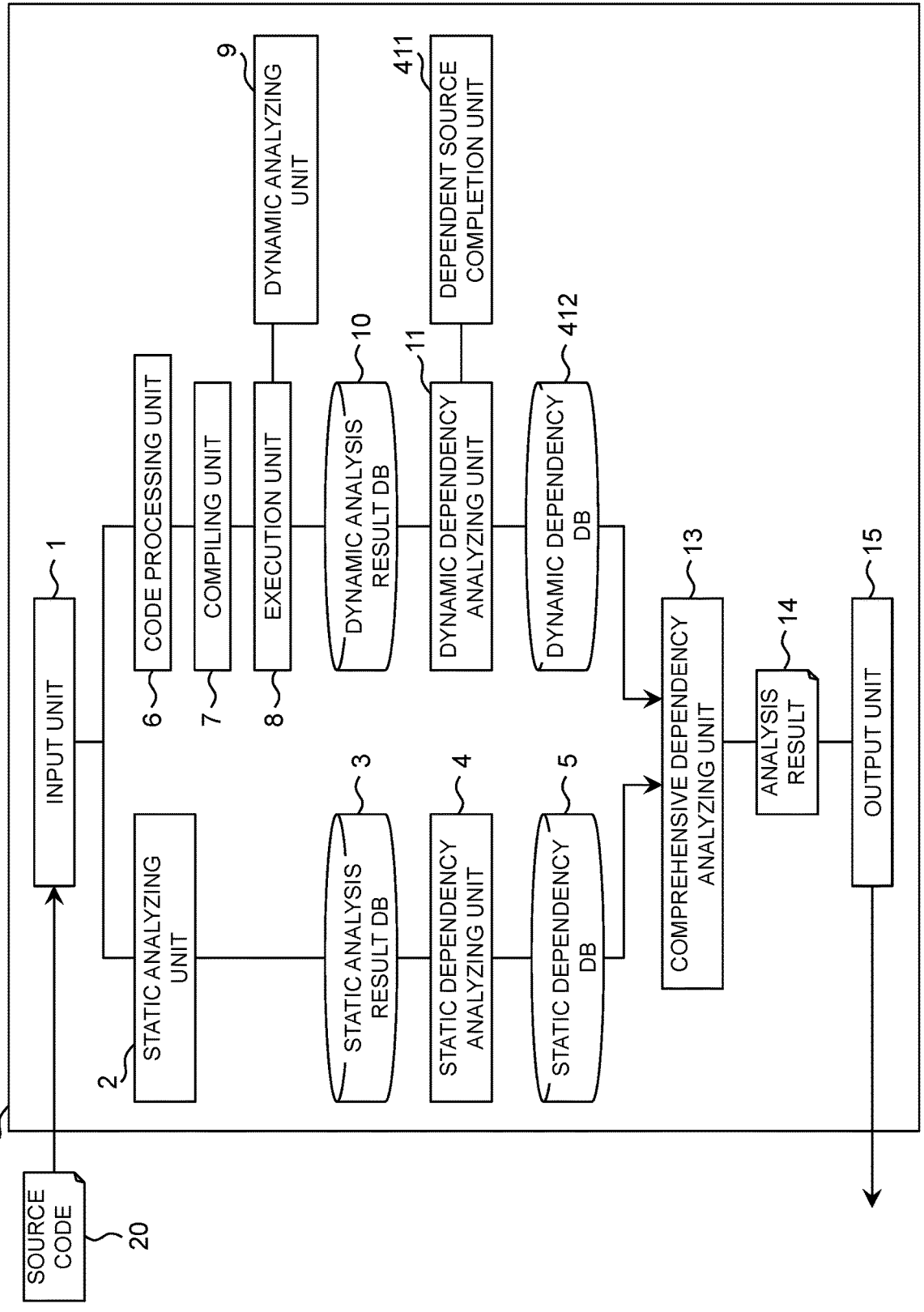
FIG. 29 is a block diagram showing a configuration of an analysis device according to a fourth embodiment of the present invention.

FIG. 29 is a block diagram showing a configuration of an analysis device 400 according to a fourth embodiment of the present invention. The analysis device 400 further includes a dependent source completion unit 411, in addition to the configuration of the analysis device 100 of the first embodiment. The dependent source completion unit 411 can analyze dependency when transitioning from a call destination function to a call source function, even when an operation log (see FIG. 8) is acquired from a middle of program execution.

Figure 30:
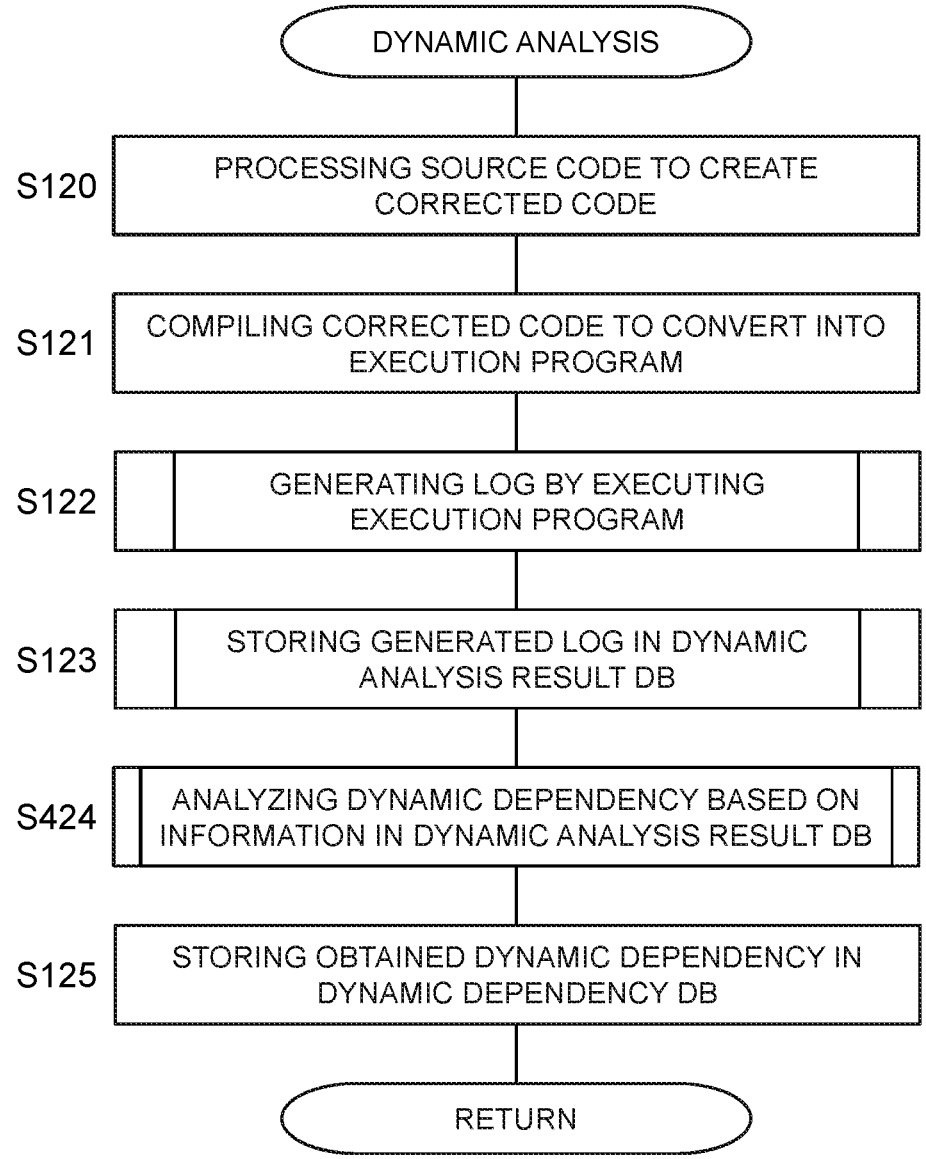
FIG. 30 is a flowchart showing a flow of dynamic analysis in the fourth embodiment.

An operation flow of the analysis device 400 is similar to the flow shown in the flowchart of FIG. 2 of the first embodiment, but only a content of a dynamic analysis step (S103 in FIG. 2) is different. FIG. 30 is a flowchart showing a flow of dynamic analysis in the fourth embodiment. The flowchart of FIG. 30 is also similar to the flowchart of FIG. 5 of the first embodiment, except for step S424 of analyzing dynamic dependency.

However, since step S122 of generating a log is executed from a middle of the program, an operation log is acquired from a middle of the program execution. FIG. 31 is a table showing an example of an operation log 422 acquired from a middle of program execution. In the operation log 422, function names and states in and after execution order 4 are recorded. Function names and states of execution order 1 to 3 are not recorded.

Figure 32:
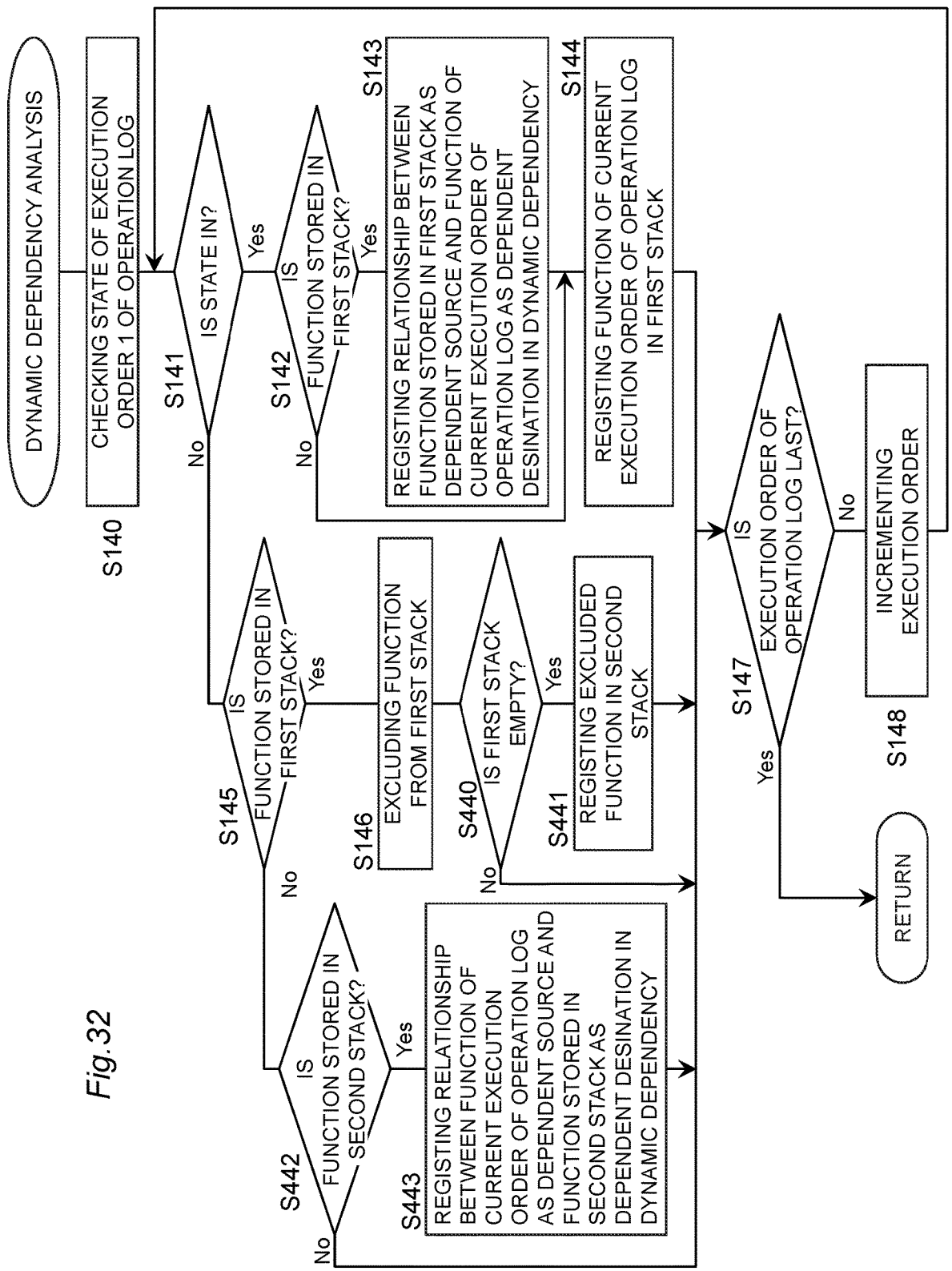
FIG. 32 is a flowchart showing a detailed flow of a step of analyzing dynamic dependency.

FIG. 32 is a flowchart showing a detailed flow of step S424 of analyzing dynamic dependency. The dependent source completion unit 411 determines whether or not IN is recorded in a "state" field of execution order 1 of the operation log 422 (S140, S141). When it is determined that IN is recorded, the process proceeds to step S142. However, since a flow in and after step S142 is similar to the flow of the first embodiment shown in FIG. 9, the description thereof will be omitted.

Figure 33:
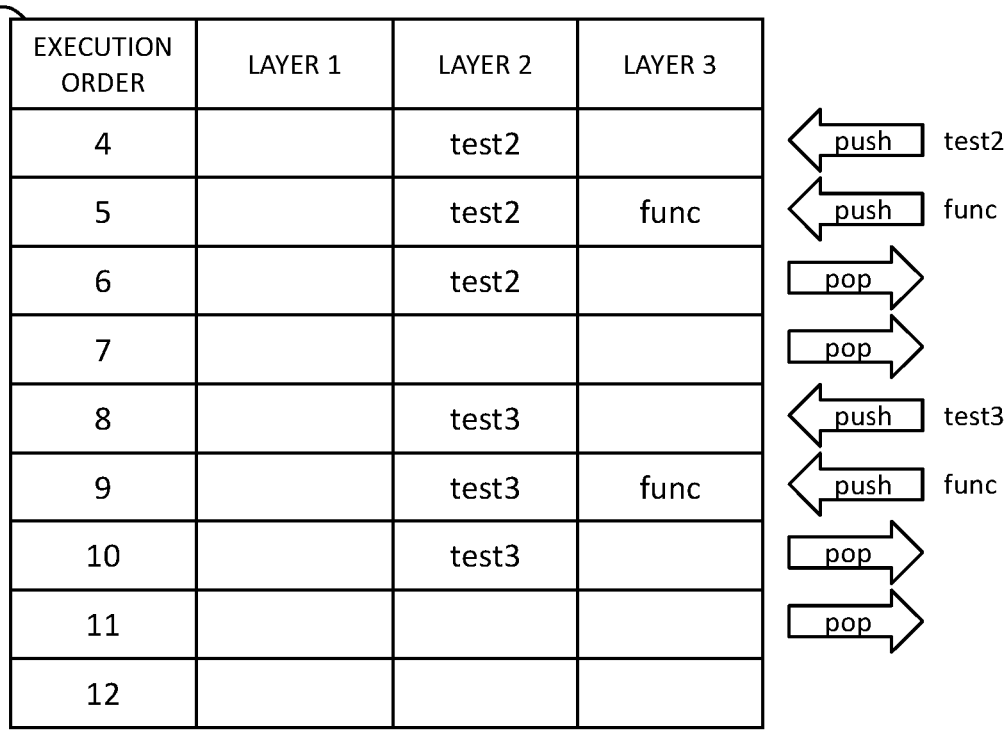
FIG. 33 is a table showing an example of a dynamic dependency analysis stack.

When it is determined in step S141 that IN is not recorded, the dependent source completion unit 411 determines whether or not a function is stored in a dynamic dependency analysis stack (a first stack) 423 shown in FIG. 33 (S145). When a function is stored in the first stack 423, the function is popped from the first stack 423 (S146).

Figure 34:
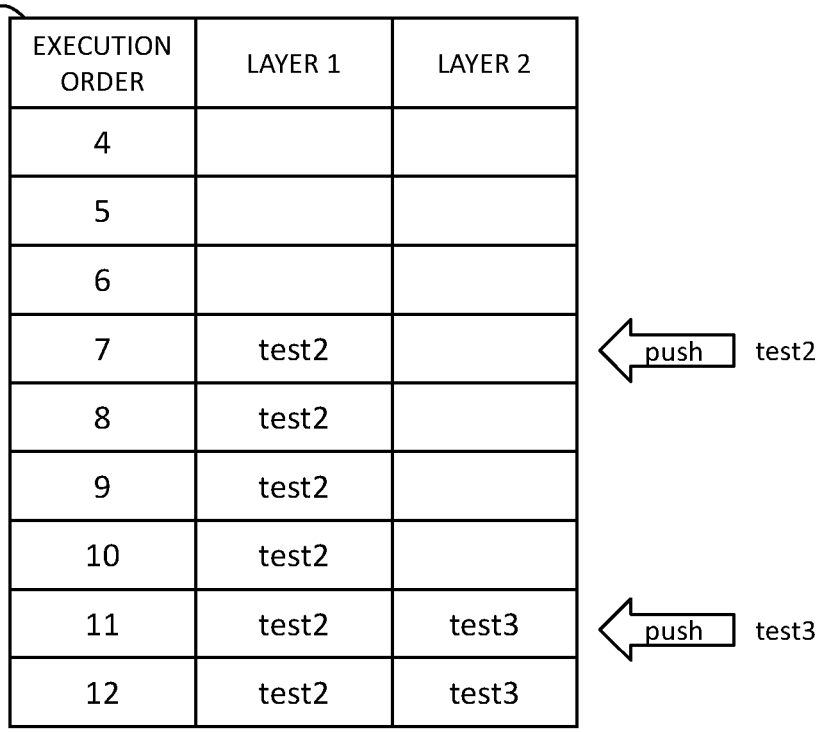
FIG. 34 is a table showing an example of an unknown-call-source function stack.

After the popping, the dependent source completion unit 411 determines whether or not the first stack 423 has become empty (S440). When it is determined that the first stack 423 has become empty, the dependent source completion unit 411 pushes the function popped in step S146, to an unknown-call-source function stack 424 (hereinafter referred to as a "second stack") (S441). FIG. 34 is a table showing an example of the second stack. After step S441, the process proceeds to step S147 (see FIG. 9) described in the first embodiment.

When it is determined in step S145 that no function is stored in the first stack 423, the dependent source completion unit 411 determines whether or not a function is stored in the second stack (S442). When it is determined that the function is stored in the second stack, the dependent source completion unit 411 registers dependency in dynamic dependency, with a function of the current execution order of the operation log 422 as a dependent source and a function registered in the second stack as the dependent destination (S443). After the registration, the process proceeds to step S147.

Features of such a fourth embodiment will be described with reference to the illustrated example. In the illustrated example, since the operation log 422 (see FIG. 31) has been acquired from a middle of the program, a program operation before start processing of a test2 function is unknown. Therefore, when a state of the test2 function becomes OUT in execution order 7 (see FIG. 31), the test2 function is popped from the first stack 423 (FIG. 33), and there will be no function in the first stack 423. That is, a call source of the test2 function is unknown. Therefore, the test2 function is registered in the unknown-call-source function stack (the second stack) 424 (S441). When the state of a main function becomes OUT in execution order 12, it is known that a call function of the test2 function has been the main function (see FIG. 31). Therefore, the main function as a dependent source function and the test2 function as a dependent destination function are registered in the dynamic dependency (S443). This similarly applies to a test3 function.

As described above, a dynamic dependency database 412 as shown in FIG. 35 is obtained.

As described above, in the analysis device 400, when the dependent source completion unit 411 acquires the operation log 422 indicating an execution order of a function from a middle of program execution, dependency between functions is complemented based on information in the operation log 422 showing transition from a call destination function to a call source function.

As a result, even when the program is executed from a middle in dynamic analysis, the analysis device 400 can analyze a call source function, and can analyze dependency between software components more comprehensively than the conventional technology.

Fifth Embodiment

Figure 36:
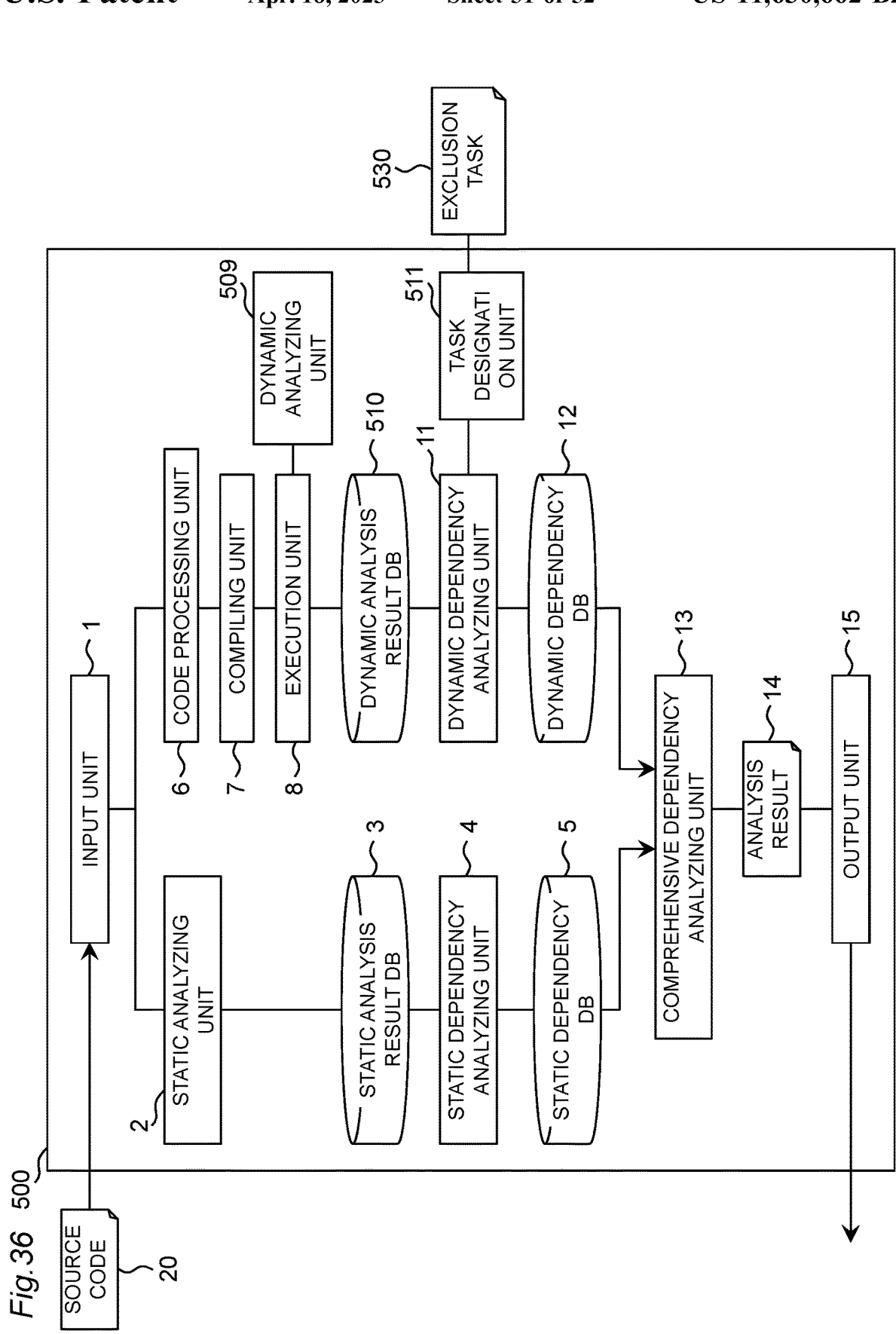
FIG. 36 is a block diagram showing a configuration of an analysis device according to a fifth embodiment of the present invention.

FIG. 36 is a block diagram showing a configuration of an analysis device 500 according to a fifth embodiment of the present invention. The analysis device 500 further includes a task designation unit 511, in addition to the configuration of the analysis device 100 of the first embodiment.

An operation flow of the analysis device 500 is similar to the flow shown in the flowchart of FIG. 2 of the first embodiment, but only a step of analyzing dynamic dependency (S124 of FIG. 5) in a dynamic analysis step (S103 of FIG. 2) is different.

FIG. 37 is a view showing an operation log 522. The operation log 522 is created by a dynamic analyzing unit 509, and stored in a dynamic analysis result database 510. As compared with the operation log 22 of the first embodiment shown in FIG. 8, the operation log 522 is further provided with a "task" field. In the "task" field, a task that executes a function described in a "function name" field is recorded. In the operation log 522, interrupt functions described in execution orders 5 and 6 are an example of interrupt processing executed by an interrupt task Interrupt.

Figure 38:
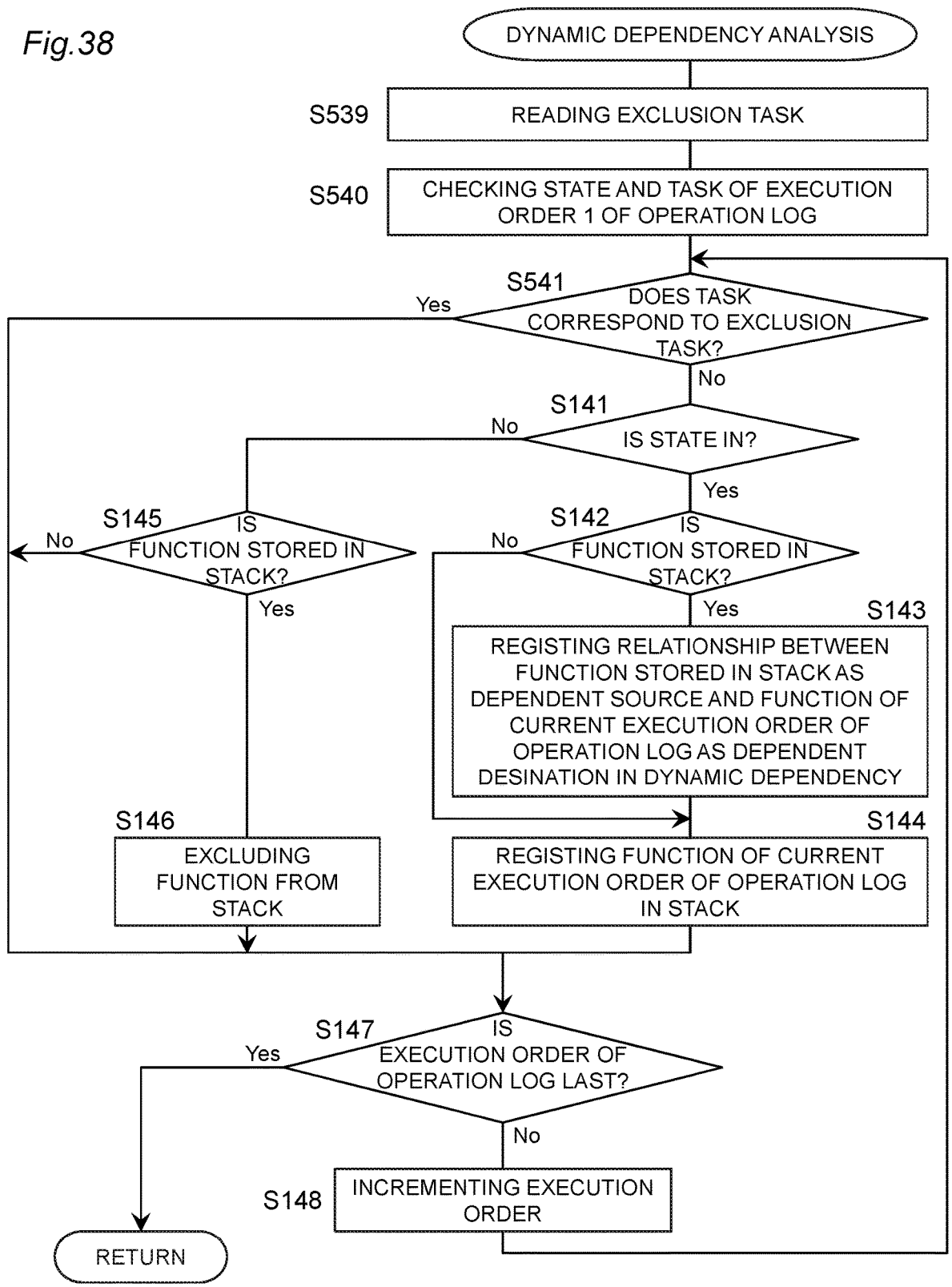
FIG. 38 is a flowchart showing a detailed flow of a step of analyzing dynamic dependency in the fifth embodiment.

FIG. 38 is a flowchart showing a detailed flow of the step of analyzing dynamic dependency in the fifth embodiment. In the fifth embodiment, a user designates an exclusion task 530 (see FIG. 36). The designated task is excluded from an analysis target. The user inputs the exclusion task 530 to the analysis device 500 by using an input device (not shown) such as a mouse, a keyboard, a touch panel, a button, or a microphone for voice input. The exclusion task 530 may be selected from the operation log 522, or may be set in advance.

The task designation unit 511 first reads the input exclusion task 530 (S539). Next, the task designation unit 511 checks a "state" field and a "task" field of execution order 1 in the operation log 522 (see FIG. 37) (S540). When a task recorded in the "task" field does not correspond to the exclusion task 530, the process proceeds to step S141 (S541). Since steps S141 to S148 are similar to the steps of the first embodiment shown in FIG. 9, description thereof will be omitted.

When it is determined in step S541 that the task recorded in the "task" field corresponds to the exclusion task 530, analysis of dynamic dependency is omitted, and the process proceeds to step S147.

For example, when the user desires to exclude dependency analysis for interruption processing, the user designates the Interrupt task as the exclusion task 530. This causes execution orders 5 and 6 of the operation log 522 shown in FIG. 37 to be excluded from the analysis target. Therefore, dependency between a test2 function and the interrupt function is not output.

As described above, the analysis device 500 further includes the task designation unit 511 that accepts an input of the exclusion task 530 that designates a task to be analyzed. The task designation unit 511 does not analyze dependency between functions related to the task designated by the exclusion task 530, but analyzes dependency between functions for other tasks. This makes it possible to exclude analysis of interrupt functions that originally have no dependency, and to reduce a load applied to the analysis device 500 in the dynamic analysis process. In addition, it is possible to reduce man-hours for the user to check an influence at a time of changing software.

Sixth Embodiment

Figure 39:
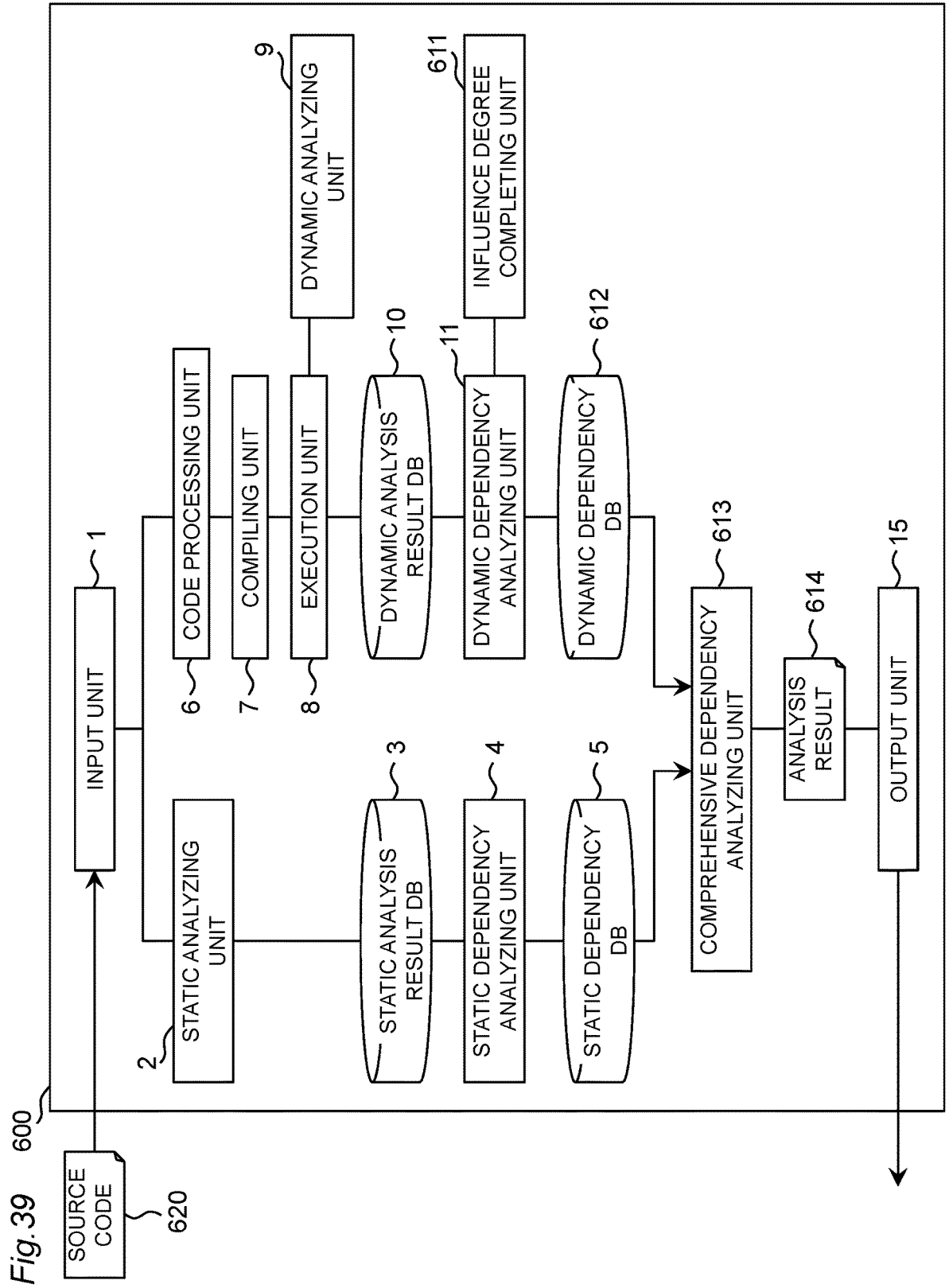
FIG. 39 is a block diagram showing a configuration of an analysis device according to a sixth embodiment of the present invention.

FIG. 39 is a block diagram showing a configuration of an analysis device 600 according to a sixth embodiment of the present invention. The analysis device 600 further includes an influence degree completing unit 611, in addition to the configuration of the analysis device 100 of the first embodiment.

Figures 40, 41:
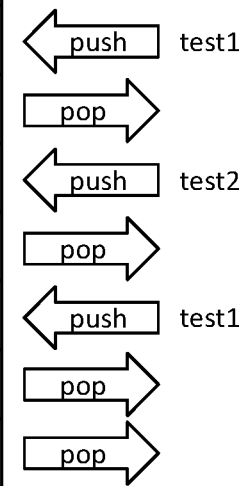
FIG. 40 is a table showing an example of an operation log.
FIG. 41 is a table showing an example of a dynamic dependency analysis stack.

An operation flow of the analysis device 600 is similar to the flow shown in the flowchart of FIG. 2 of the first embodiment, but only a step of analyzing dynamic dependency (S124 of FIG. 5) in a dynamic analysis step (S103 of FIG. 2) is different. An operation of the analysis device 600 will be described with reference to an operation log 622 shown in FIG. 40 and a dynamic dependency analysis stack (first stack) 623 shown in FIG. 41.

Figure 42:
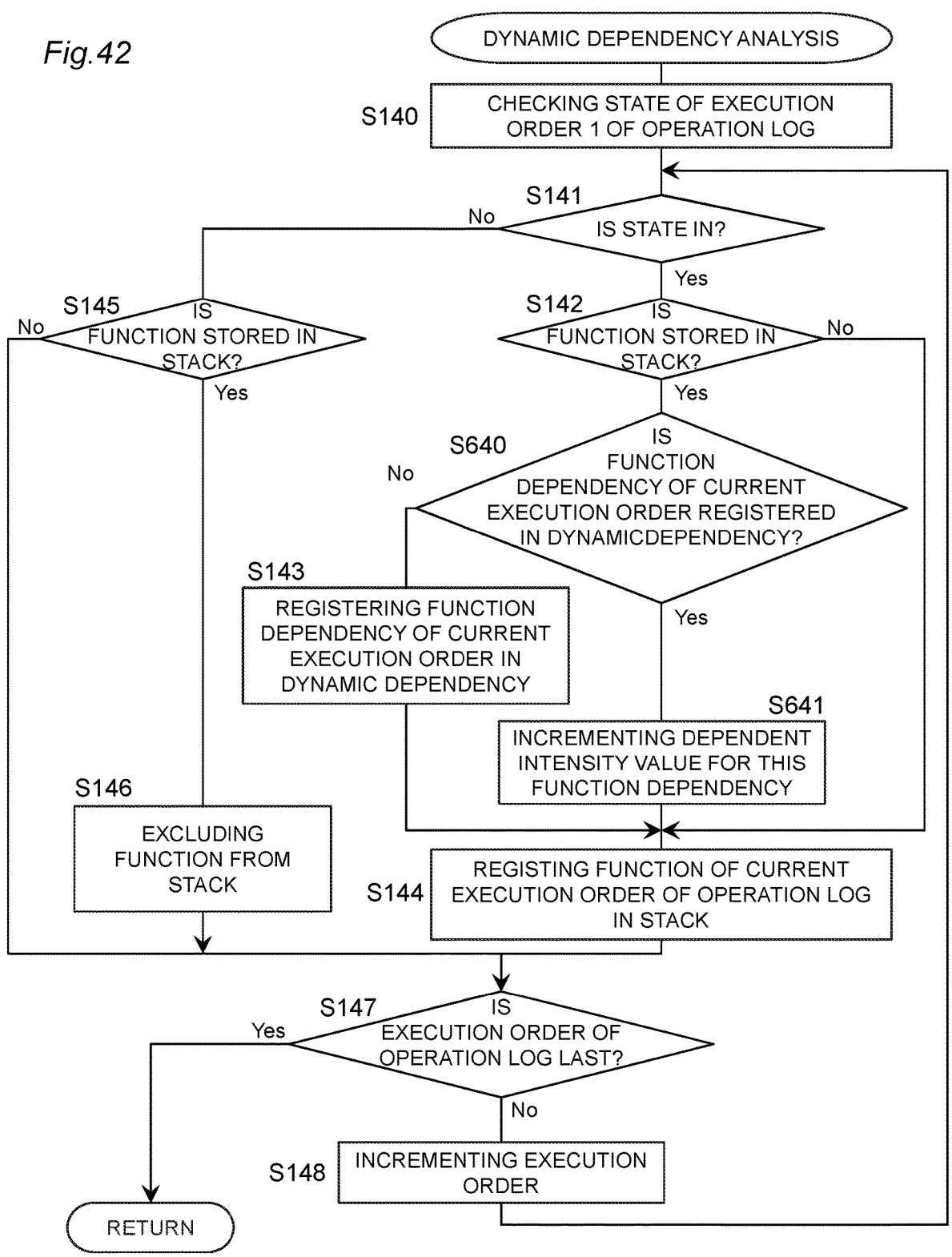
FIG. 42 is a flowchart showing a detailed flow of a step of analyzing dynamic dependency in the sixth embodiment.

FIG. 42 is a flowchart showing a detailed flow of the step of analyzing dynamic dependency in the sixth embodiment. As compared with the flowchart of the first embodiment shown in FIG. 9, step S640 and step S641 are added in the flowchart of FIG. 42.

The influence degree completing unit 611 determines whether or not IN is recorded in a "state" field of execution order 1 of the operation log 622 (S140, S141). When it is determined that IN is not recorded, the process proceeds to step S145. However, since a flow of steps S145 to S148 is similar to the flow of the first embodiment shown in FIG. 9, the description thereof will be omitted.

When it is determined in step S141 that IN is recorded, the dynamic dependency analyzing unit 11 determines whether or not a function is stored in the first stack 623 (S142). When it is determined that no function is stored, the process proceeds to step S144.

When it is determined in step S142 that a function is stored in the first stack 623, the influence degree completing unit 611 determines whether or not function dependency of the current execution order is registered in the dynamic dependency (S640). Specifically, the influence degree completing unit 611 determines whether or not function dependency with a function stored in the first stack 623 as a dependent source and a function of the current execution order of the operation log 622 as a dependent destination is registered in dynamic dependency.

When it is determined that the function dependency of the current execution order is registered in the dynamic dependency, the influence degree completing unit 611 increments a dependent intensity value for the function dependency (S641). The dependent intensity value is a value indicating intensity of dependency between two functions. As the dependent intensity value is larger, the dependent intensity between the functions is stronger. An initial value of the dependent intensity value is, for example, 0. After incrementing the dependent intensity value, the process proceeds to step S144.

When it is determined in step S640 that the function dependency of the current execution order is not registered in the dynamic dependency, the influence degree completing unit 611 registers the function dependency of the current execution order, into the dynamic dependency (S143). After the registration, the process proceeds to step S144.

By performing each step shown in FIG. 42, the dynamic dependency as shown in FIG. 43 is obtained and stored in a dynamic dependency database 612.

Next, an operation of a comprehensive dependency analyzing unit 613 (see FIG. 39) will be described. When static analysis (see FIG. 3) is performed on a source code 620 as shown in FIG. 44, static dependency as shown in FIG. 45 is stored in a static dependency database 5. Further, when dynamic analysis is performed on the source code 620, dynamic dependency as shown in FIG. 43 is stored in the dynamic dependency database 612.

Figure 46:
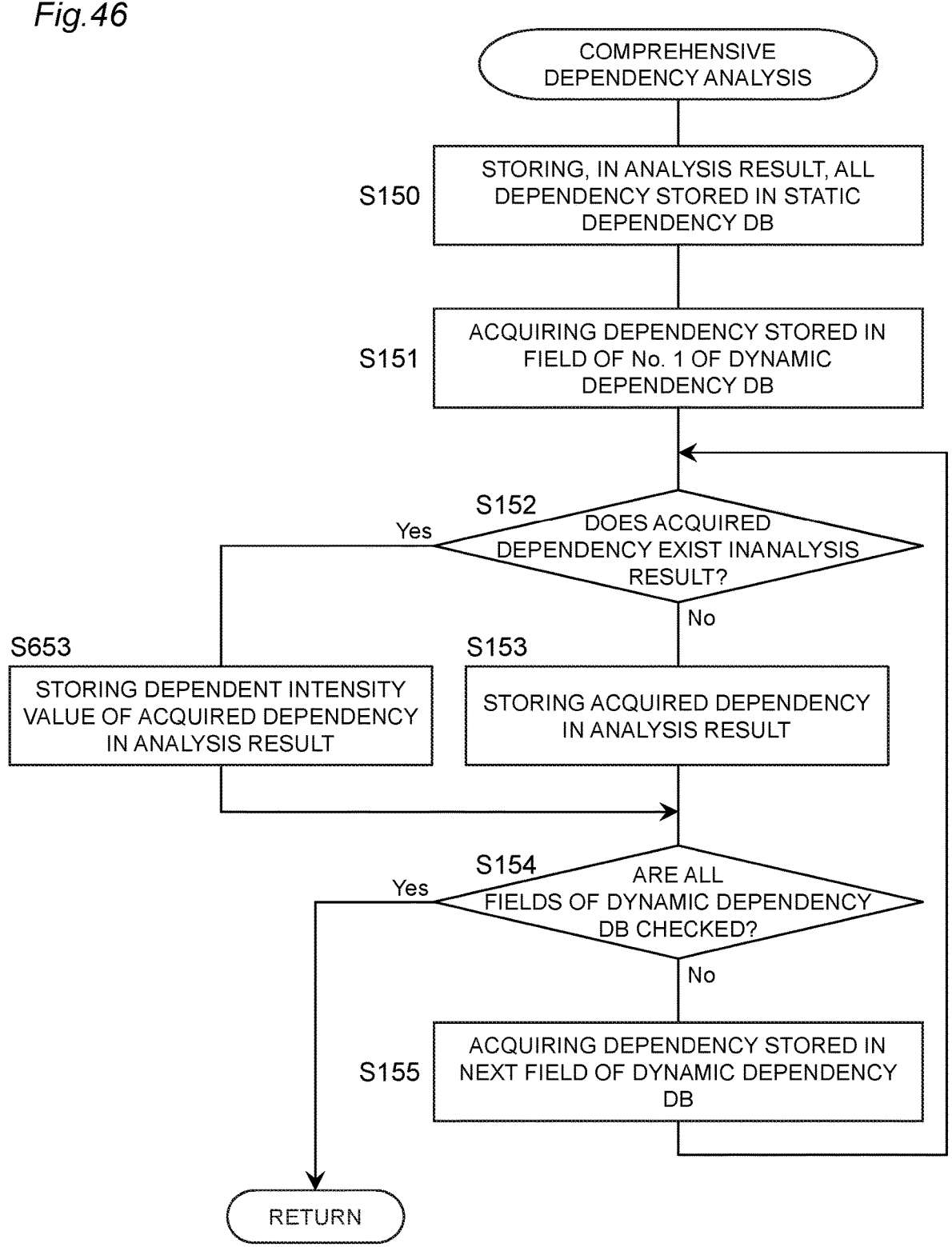
FIG. 46 is a flowchart showing a detailed flow of a step of analyzing comprehensive dependency.

FIG. 46 is a flowchart showing a detailed flow of a step of analyzing comprehensive dependency. As compared with the flowchart of the first embodiment shown in FIG. 12, step S653 is added in the flowchart of FIG. 46.

In the step of analyzing comprehensive dependency, the comprehensive dependency analyzing unit 613 stores all the dependency stored in the static dependency database 5, into an analysis result 614 (S150). Next, the comprehensive dependency analyzing unit 613 acquires dependency stored in a row of No. 1 of the dynamic dependency database 612 as shown in FIG. 43 (S151). Next, the comprehensive dependency analyzing unit 613 determines whether or not the acquired dependency exists in the analysis result 614 (S152). When it is determined that the dependency does not exist, the comprehensive dependency analyzing unit 613 stores the acquired dependency in the analysis result 614 (S153), and the process proceeds to the next step S154.

When it is determined in step S152 that the acquired dynamic dependency exists in the analysis result 614, a dependent intensity value of the acquired dependency is stored in the analysis result (S653). After the storing, the process proceeds to step S154.

Since steps S154 and S155 are similar to those in the first embodiment, the description thereof will be omitted.

FIG. 47 is a table showing an example of the analysis result 614 after the step of analyzing comprehensive dependency is finished.

As described above, the analysis device 600 can obtain the analysis result 614 to which the dependent intensity value is added. This makes it possible to obtain dependency in which a weighting index is loaded. Therefore, when software is changed, an extent of influence of the change can be efficiently checked, and dependency between components of the software can be analyzed with high accuracy.

Seventh Embodiment

Figure 48:
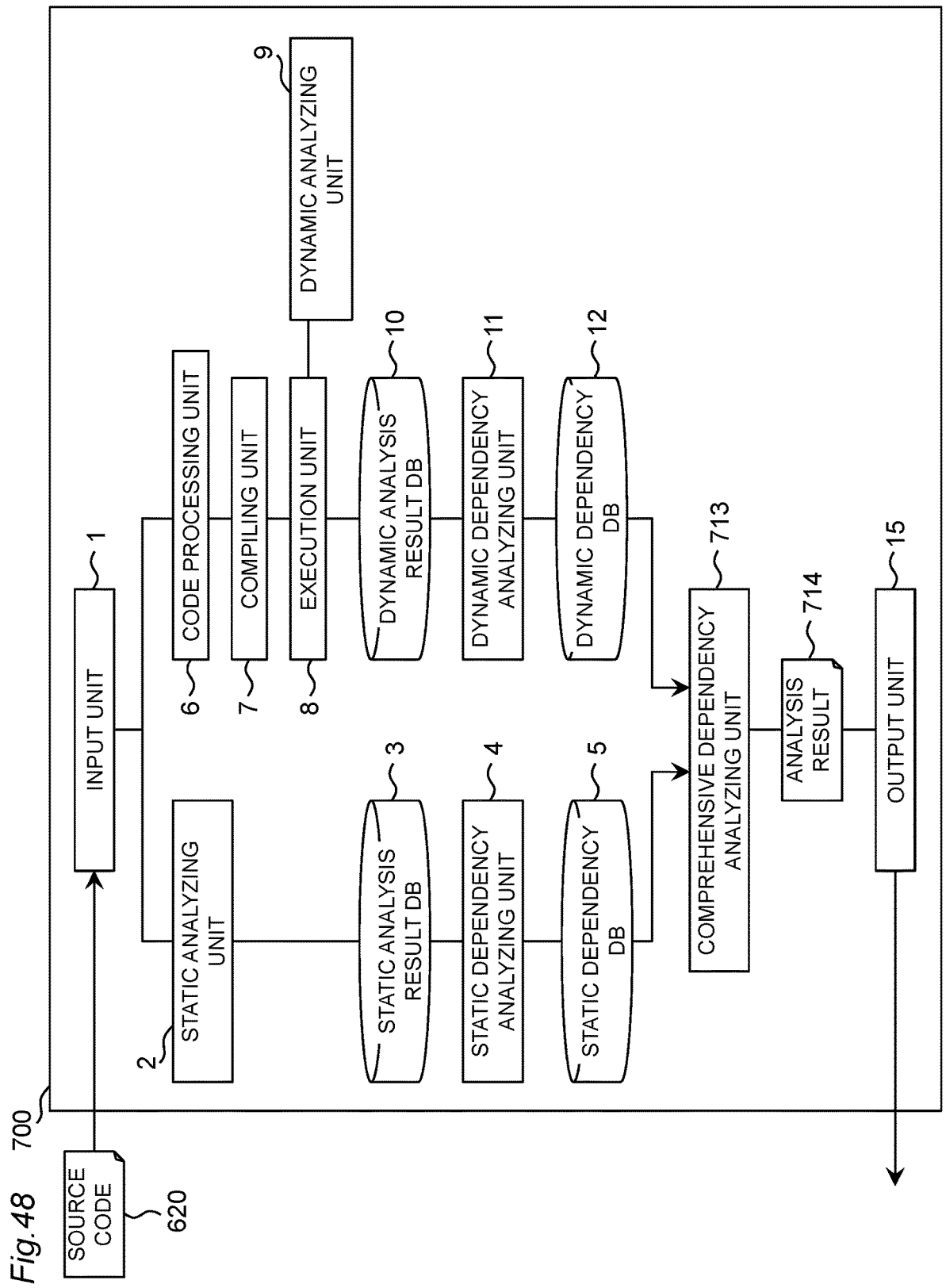
FIG. 48 is a block diagram showing a configuration of an analysis device according to a seventh embodiment of the present invention.

FIG. 48 is a block diagram showing a configuration of an analysis device 700 according to a seventh embodiment of the present invention. The analysis device 700 is similar to the analysis device 100 of the first embodiment, except for an operation of a comprehensive dependency analyzing unit 713 and a content of an analysis result 714.

An example of analyzing a source code 620 (see FIG. 44) similar to the sixth embodiment will be described. When static analysis (see FIG. 3) is performed on the source code 620, similarly to the sixth embodiment, static dependency as shown in FIG. 45 is stored in a static dependency database 5. Further, when dynamic analysis is performed on the source code 620, dynamic dependency as shown in FIG. 49 is stored in a dynamic dependency database 12.

Figure 50:
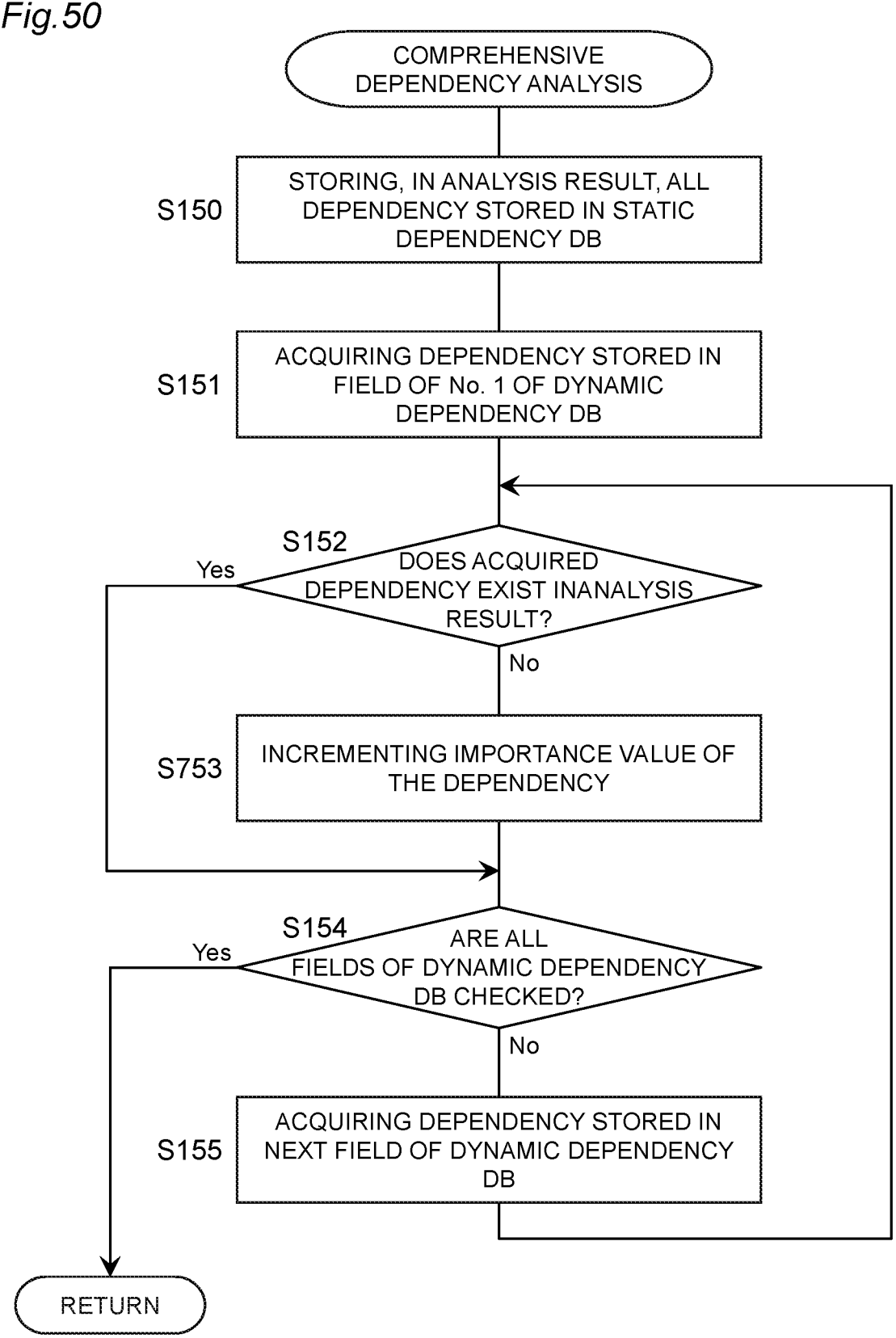
FIG. 50 is a flowchart showing a detailed flow of a step of analyzing comprehensive dependency.

FIG. 50 is a flowchart showing a detailed flow of a step of analyzing comprehensive dependency. First, the comprehensive dependency analyzing unit 713 stores, in the analysis result 714, all the dependency stored in the static dependency database 5 (S150). Next, the comprehensive dependency analyzing unit 713 acquires dependency stored in a row of No. 1 of the dynamic dependency database 12 as shown in FIG. 49 (S151). Next, the comprehensive dependency analyzing unit 713 determines whether or not the acquired dependency exists in the analysis result 714 (S152).

When it is determined that the acquired dependency exists, the comprehensive dependency analyzing unit 713 increments an importance value of the acquired dependency, and stores a result in the analysis result 714 (S753). After the storing, the process proceeds to the next step S154. When it is determined in step S152 that the acquired dependency does not exist in the analysis result 714, the process also proceeds to step S154.

The importance value of dependency is a value indicating importance of the dependency. As the importance value is larger, the dependency is more important to the program. An initial value of the importance value is, for example, 0.

Since steps S154 and S155 are similar to those in the first embodiment, the description thereof will be omitted.

FIG. 51 is a table showing an example of the analysis result 714 after the step of analyzing comprehensive dependency is finished.

As described above, the analysis device 700 can obtain the analysis result 714 to which the importance value is added. This makes it possible to obtain dependency in which a weighting index is loaded. Therefore, when software is changed, an extent of influence of the change can be efficiently checked, and dependency between components of the software can be analyzed with high accuracy.

Eighth Embodiment

Figure 52:
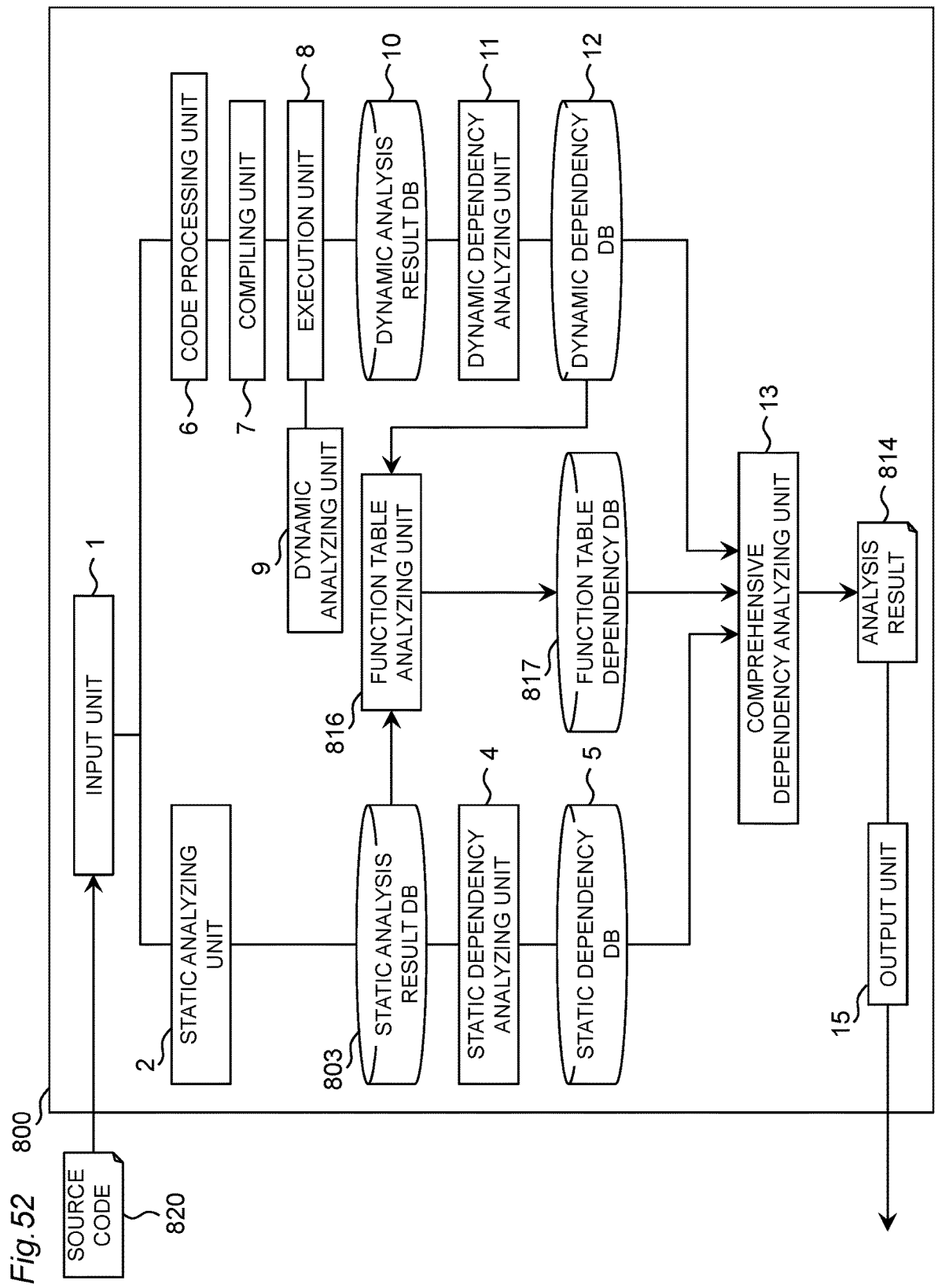
FIG. 52 is a block diagram showing a configuration of an analysis device according to an eighth embodiment of the present invention.

FIG. 52 is a block diagram showing a configuration of an analysis device 800 according to an eighth embodiment of the present invention. The analysis device 800 includes a function table analyzing unit 816 and a function table dependency database (DB) 817, in addition to the configuration of the analysis device 100 of the first embodiment. A source code 820 in FIG. 52 is an example of a source code containing a function table.

Figure 53:
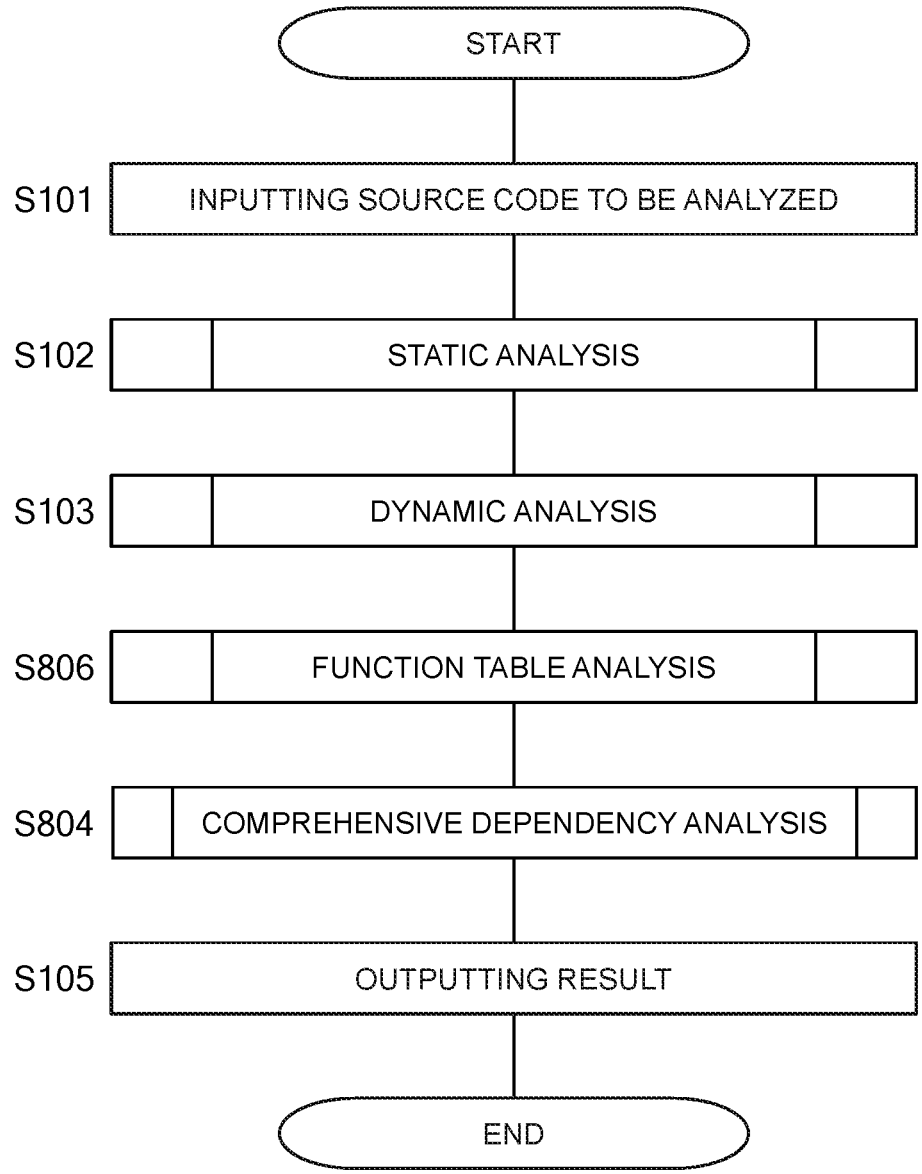
FIG. 53 is a flowchart showing an operation flow of the analysis device according to the eighth embodiment of the present invention.

FIG. 53 is a flowchart showing an operation flow of the analysis device 800. In addition to the operation of the first embodiment shown in FIG. 2, the analysis device 800 further includes step S806 of analyzing dependency of functions in the function table.

First, the analysis device 800 reads the source code 820 via an input unit 1 (S101). FIG. 54 is a view showing an example of the source code 820. The source code 820 contains description of a function table. The function table is an example of a "collective data group" of the present disclosure.

Next, as shown in FIG. 53, the analysis device 800 executes static analysis on the source code 820, and analyzes static dependency (S102). FIG. 55 is a view showing an example of a static analysis result database 803 generated in step S102. The static analysis result database 803 includes a function list 8031 as shown in FIG. 4b of the first embodiment, and a character string array 8032 indicating a character string array in the source code 820. The source code 820 may describe a plurality of character string arrays 8032 in some cases, and the static analysis result database 803 may contain a plurality of character string arrays 8032.

Returning to FIG. 53, after step S102 of analyzing static dependency, the analysis device 800 performs dynamic analysis on the source code 820 to analyze dynamic dependency (S103). FIG. 56 is a view showing an example of a dynamic dependency database 12 that stores a result obtained in step S103. Note that an execution order of step S102 and step S103 may be reversed, and step S103 may be executed before step S102.

As shown in FIG. 52, the static analysis result database 803 and the dynamic dependency database 12 are also input to the function table analyzing unit 816. As shown in FIG. 53, the function table analyzing unit 816 analyzes dependency of functions in the function table after step S102 and step S103 (S806).

FIG. 57 is a flowchart showing a detailed flow of step S806 of analyzing dependency of functions in the function table, shown in FIG. 53. First, the function table analyzing unit 816 determines whether or not a dependent destination function in the dynamic dependency database 12 matches any of character strings registered in the character string array 8032 in the static analysis result database 803 (S807). In a case of match, the process proceeds to the next step S808. In a case of mismatch, step S806 (see FIG. 53) of analyzing dependency of functions in the function table is finished. In the example shown in FIGS. 55 and 56, since a test1 function in the dynamic dependency database 12 matches a string registered in the character string array 8032, the process proceeds to step S808.

Next, 1 is set to an array element number of the character string array 8032 in the static analysis result database 803, and the array element number 1 of the character string array 8032 is checked (S808).

Next, the function table analyzing unit 816 determines whether or not a character string registered in the set array element number among character strings of the character string array 8032 exists in the function list 8031 (S809). When the character string registered in the set array element number does not exist in the function list 8031, step S806 (see FIG. 53) of analyzing dependency of the functions in the function table is finished.

When the character string registered in the set array element number among the character strings of the character string array 8032 exists in the function list 8031, the function table analyzing unit 816 stores, in the function table dependency database 817 (S810), dependency with the character string of the character string array 8032 as a dependent destination and a dependent source function of the dynamic dependency database 12 as a dependent source. Steps S809 and S810 are performed for all array element numbers in the character string array 8032 of the static analysis result database 803 (S811, S812).

FIG. 58a is a view showing an example of the function table dependency database 817, after step S806 of analyzing dependency of the functions in the function table is finished. The function table dependency database 817 shows dependency including a call destination function that has not been executed at a time of particular execution of the source code 820, but can be executed depending on a return value of a random function.

That is, when the source code 820 as shown in FIG. 54 is compiled and executed, in a main function, a function registered in a function table testTable is executed using a return value of a rand function, which is a random function. In a result of the dynamic dependency analysis shown in FIG. 56, the test1 function is executed. Therefore, when checking the static analysis result database 803 shown in FIG. 55, it can be seen that the character string array 8032 containing the test1 function also contains test2 to 4 functions. Therefore, it can be seen that the test2 to 4 functions can be executed instead of the test1 function, depending on the return value of the random function. In such a case, even if contents of the test2 to 4 functions are changed, influence on the main function should be considered. Using the analysis device 800 of the eighth embodiment makes it possible to also analyze dependency between the test2 to 4 functions and the main function as described above.

FIG. 58b is a view showing another example of the function table dependency database 817, after step S806 of analyzing dependency of the functions in the function table is finished. In the table of FIG. 58b, an "influence degree" field is added in addition to a "dependent source" field and a "dependent destination" field of FIG. 58a.

An influence degree is calculated by the function table analyzing unit 816, for example, in step S806 of analyzing dependency of the functions in the function table. For example, in step S807 shown in FIG. 57, when it is determined that a dependent destination function in the dynamic dependency database 12 matches any of character strings registered in the character string array 8032 in the static analysis result database 803, the function table analyzing unit 816 counts a number (N1) of character strings registered in the character string array 8032. In the example shown in FIG. 55, N1=4. The count result may be stored in the function table dependency database 817 as influence degree calculation information.

Next, the function table analyzing unit 816 counts a number (N2) of character strings recorded in the dependent destination function in the dynamic dependency database 12, among character strings registered in the character string array 8032. In the example shown in FIGS. 55 and 56, N2=1. The count result may be stored in the function table dependency database 817 as influence degree calculation information.

For character strings recorded in the dependent destination function in the dynamic dependency database 12 among character strings registered in the character string array 8032, an influence degree of the function table dependency database 817 is set to 1. In FIG. 58*b*, the influence degree for the test1 function is 1. This is because the test1 function is executed in actual dynamic analysis, and thus is considered to have strong dependency with the main function.

For character strings other than those recorded in the dependent destination function in the dynamic dependency database 12 among character strings registered in the character string array 8032, an influence degree X is calculated by the following Equation (1) using the above N1 and N2.

[Formula 1]

$$X = 1 - \left(\frac{N1 - N2}{N1}\right) \quad (1)$$

In the examples shown in FIGS. 55 and 56, N1=4 and N2=1. Therefore, in FIG. 58*b*, the influence degree X for the test2 function, the test3 function, and the test4 function is 0.25 from Equation (1). The influence degree X indicates a percentage value evenly distributed to dependency in accordance with the number of functions in the function table.

After step S806 of analyzing dependency of functions in the function table is finished, step S804 of analyzing comprehensive dependency is executed. In step S804, as shown in FIG. 59, an analysis result 814 is obtained by integrating information stored in a static dependency database 5, information stored in the dynamic dependency database 12, and information stored in the function table dependency database 817.

As described above, when a function that is determined to have dependency with another function in an analysis result of the dynamic dependency analyzing unit 11 is included in a function table of software, the analysis device 800 generates an analysis result indicating that there is dependency between all the functions in the function table and the another function.

In the conventional technology, it has been unable to analyze dependency with a function table via a pointer by static analysis. In addition, in the conventional dynamic analysis, it has been possible to analyze dependency on an executed function among dependency on the function table, but it has been unable to analyze dependency on an unexecuted function. On the other hand, when the program executes some functions registered in the function table, the analysis device 800 can analyze dependency on other functions registered in the function table. As a result, when software is changed, it is possible to efficiently check an extent of influence of the change, and to analyze dependency between software components with high accuracy.

Ninth Embodiment

Figure 60:
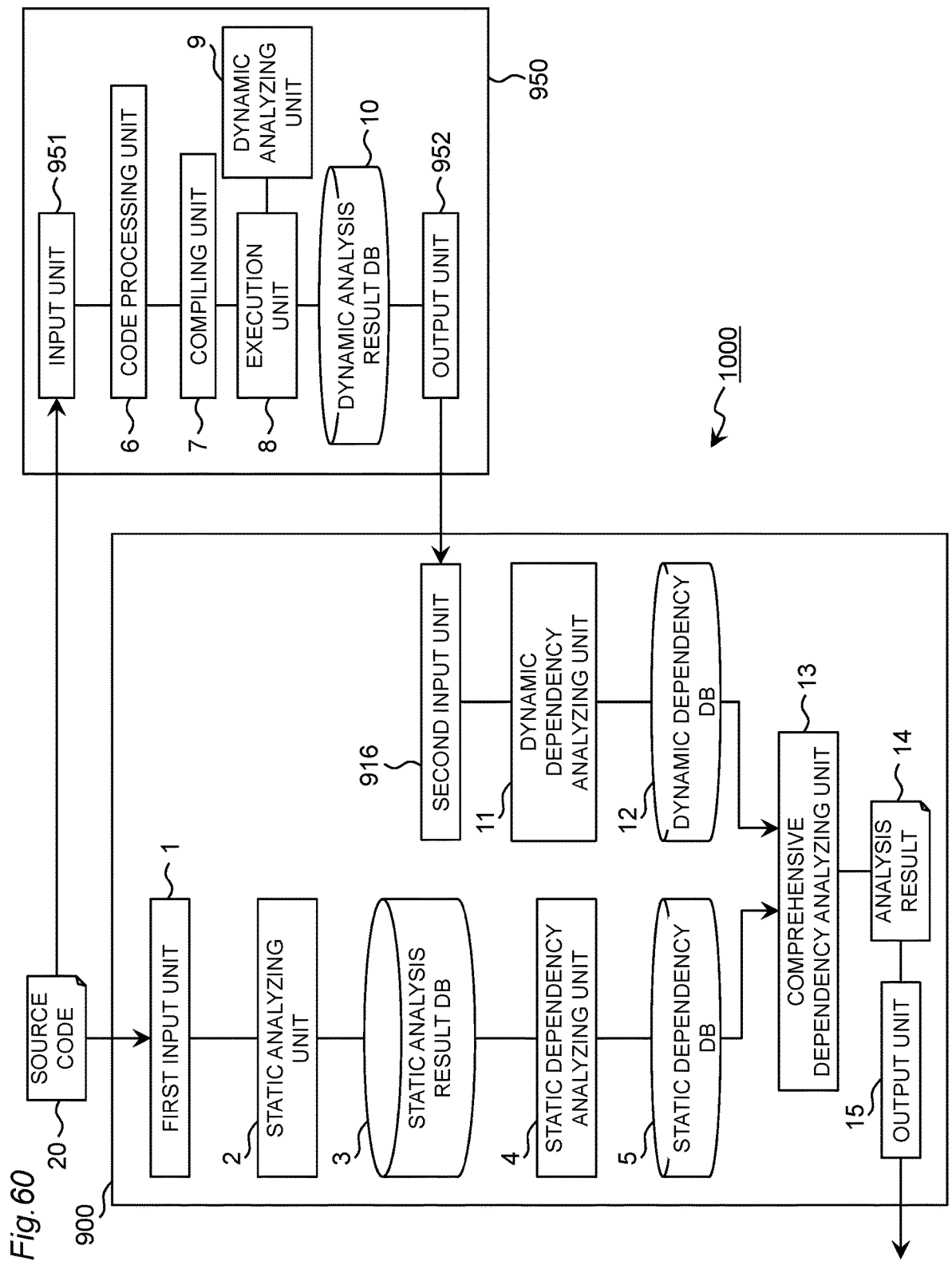
FIG. 60 is a block diagram showing a configuration of an analysis device according to a ninth embodiment of the present invention.

FIG. 60 is a block diagram showing a configuration of an analysis system 1000 according to a ninth embodiment of the present invention. The analysis system 1000 includes an analysis device 900 and an external device 950. An analysis function of the present invention need not be realized by only components in one device as in the analysis device 100 (see FIG. 1) of the first embodiment, but may be realized by cooperation of a plurality of devices.

In the ninth embodiment, a source code 20 is input not only to the analysis device 900 but also to the external device 950. The external device 950 includes an input unit 951 that reads the source code 20. Further, the external device 950 includes a code processing unit 6, a compiling unit 7, an execution unit 8, a dynamic analyzing unit 9, and a dynamic analysis result database 10 similar to those of the analysis device 100 of the first embodiment. The external device 950 further includes an output unit 952 that outputs data stored in the dynamic analysis result database 10.

The external device 950 performs step S120 of creating a corrected code shown in FIG. 5, step S121 of compiling the corrected code to convert into an execution program, a log generation step S122, and step S123 of storing the log in the dynamic analysis result database 10. The data stored in the dynamic analysis result database 10 is output to the analysis device 900 via the output unit 952.

The data output from the output unit 952 of the external device 950 is input to a second input unit 916 of the analysis device 900.

Unlike the analysis device 100 of the first embodiment, the analysis device 900 does not include a code processing unit 6, a compiling unit 7, an execution unit 8, a dynamic analyzing unit 9, and a dynamic analysis result database 10. This is because functions realized by these components are realized by the external device 950. Except for these components, the analysis device 900 includes components similar to those of the analysis device 100 of the first embodiment.

As described above, the components that realize the analysis function of the present invention may be realized by a plurality of devices. This allows, for example, a computer having a high processing capacity to be in charge of dynamic analysis having a high processing load.

Further, in addition to providing a device that is in charge of a part that performs dynamic analysis as described above, databases such as, for example, a static analysis result database 3, a dynamic analysis result database 10, a static dependency database 5, and a dynamic dependency database 12 may be stored in a storage device external to the analysis device 900. Such an external storage device may be, for example, an external server capable of communicating with the analysis device 900 and the external device 950 via a network.

Modified example 1 In the first to ninth embodiments described above, an example in which the program is executed only once has been described as dynamic analysis. However, the present invention is not limited to this, and dynamic analysis may be performed by executing the program a plurality of times to merge or accumulate operation logs.

FIG. 61*a* is a table showing an operation log 22*a* that is obtained by the execution unit 8 (see FIG. 1) executing an execution program by giving specific input data in a specific environment in step S122 (see FIG. 5). FIG. 61*b* is a table showing an operation log 22*b* obtained by executing the execution program in another environment or by giving other input data. As shown in FIGS. 61*a* and 61*b*, different operation logs are output when different execution paths are passed, even for the same program.

The operation logs 22*a* and 22*b* are stored in the dynamic analysis result database 10. Performing step S124 (see FIG. 9) of analyzing dynamic dependency based on the operation log 22*a* gives dynamic dependency 14*a* as shown in FIG. 62*a*. On the other hand, performing step S124 of analyzing dynamic dependency based on the operation log 22b gives dynamic dependency 14b as shown in FIG. 62b. By combining the dynamic dependency 14a and the dynamic dependency 14b, dynamic dependency 14c as shown in FIG. 62c is obtained.

In this way, the program can be analyzed via various execution paths, and highly accurate analysis can be realized.

Modified Example 2

In the first to ninth embodiments described above, the analysis device that outputs an analysis result from the output unit 15 has been described. Instead of outputting the analysis result, the analysis device of the present invention may include a display unit that displays the analysis result to a user. The display unit may display not only a result of final comprehensive dependency analysis, but also a static structural analysis result, a static dependency analysis result, a dynamic analysis result, and a dynamic dependency analysis result. The display unit is, for example, a liquid crystal display, an organic EL display, or a projector. This allows the user to grasp dependency between functions by checking the analysis result displayed on the display unit. For example, software development can be performed efficiently and with high accuracy, by checking a function of a dependent source displayed on the display unit, when a dependent destination function is changed.

In the present specification, embodiments and modified examples of the present invention have been described. However, the above description is an example of the present invention. Various improvements and modifications can be added to the above embodiments and modified examples without departing from the scope of the present invention. In addition, each embodiment and modified example can be combined as appropriate.

DESCRIPTION OF REFERENCE SYMBOLS

1 INPUT UNIT
2 STATIC ANALYZING UNIT
3 STATIC ANALYSIS RESULT DATABASE
4 STATIC DEPENDENCY ANALYZING UNIT
5 STATIC DEPENDENCY DATABASE
5 DYNAMIC DEPENDENCY DATABASE
6 CODE PROCESSING UNIT
7 COMPILING UNIT
8 EXECUTION UNIT
9 DYNAMIC ANALYZING UNIT
10 DYNAMIC ANALYSIS RESULT DATABASE
11 DYNAMIC DEPENDENCY ANALYZING UNIT
12 DYNAMIC DEPENDENCY DATABASE
13 COMPREHENSIVE DEPENDENCY ANALYZING UNIT
14 ANALYSIS RESULT
15 OUTPUT UNIT
20 SOURCE CODE
21 CORRECTED CODE
22 OPERATION LOG
23 DYNAMIC DEPENDENCY ANALYSIS STACK (FIRST STACK)
100 ANALYSIS DEVICE

The invention claimed is:
1. A software analysis device comprising:
a processor;
a first analyzing unit that executed by the processor to statically analyze a structure of a source code of software and analyzes dependency between objects of the software; and
a second analyzing unit that executed by the processor to execute a program indicated by the source code to acquire first information regarding an operation of the objects and analyzes dependency between the objects based on the first information,
wherein the software analysis device analyzes dependency between the objects based on an analysis result of the first analyzing unit and an analysis result of the second analyzing unit,
wherein when an object that is determined to have dependency with another object in the analysis result of the second analyzing unit is included in a collective data group of the software, the software analysis device generates an analysis result indicating that there is dependency between the collective data group and the another object, and
an influence value is calculated to indicated an influence degree of dependency between the objects, wherein the influence value is a percentage value that is evenly distributed in accordance with a number of data in the collective data group, for dependency between data in the collective data group and the another object.

2. The software analysis device according to claim 1, wherein the first information acquired by the second analyzing unit includes second information indicating an execution order of the objects.

3. The software analysis device according to claim 1, wherein the second analyzing unit generates an analysis result indicating that there is dependency between an object that calls another object and the another object that is called.

4. The software analysis device according to claim 1, wherein the second analyzing unit generates an analysis result indicating that there is dependency between an object that has transmitted a message and an object that has received the message.

5. The software analysis device according to claim 1 wherein the second analyzing unit analyzes dependency between the objects, based on an address of a shared memory accessed by a program indicated by the source code, and based on a time of access.

6. The software analysis device according to claim 1, further comprising:
a task designation unit that executing by the processor to accept an input of an instruction for designating a task to be analyzed,
wherein the second analyzing unit analyzes only dependency between the objects related to the designated task.

7. The software analysis device according to claim 1, wherein the software analysis device generates an analysis result including an importance value according to a number of execution times of each of the objects in an analysis process by the second analyzing unit.

8. The software analysis device according to claim 1, wherein
an influence value higher than the influence value given to dependency between the another object and other data in the collective data group is given to dependency between the another object and an object determined to have dependency with the another object in the analysis result of the second analyzing unit, among data in the collective data group.

9. The software analysis device according to claim 2, wherein
the second information includes information indicating transition from one object to another object, and
when the second analyzing unit acquires the second information from a middle of execution of a program indicated by the source code, the second analyzing unit complements dependency between the objects based on information indicating transition from a call destination object to a call source object.

10. The software analysis device according to claim 1, further comprising a display device that displays at least one of:
the analysis result of the first analyzing unit;
the analysis result of the second analyzing unit; or
the dependency between the objects analyzed based on the analysis result of the first analyzing unit and the analysis result of the second analyzing unit.

11. The software analysis device according to claim 1, further comprising:
a third analyzing unit that executed by the processor to generate an analysis result obtained by adding, to the analysis result of the second analyzing unit, dependency that does not exist in the analysis result of the second analyzing unit in the analysis result of the first analyzing unit.

12. A software analysis method comprising:
a first analysis step of statically analyzing, by a processor, a structure of a source code of software and analyzing dependency between objects of the software;
a second analysis step of executing, by the processor, a program indicated by the source code to acquire first information regarding an operation of the objects and analyzing dependency between the objects based on the first information; and
a third step of analyzing, by the processor, dependency between the objects based on an analysis result of the first analysis step and an analysis result of the second analysis step,
wherein when an object that is determined to have dependency with another object in the analysis result of the second analyzing step is included in a collective data group of the software, an analysis result is generated to indicate that there is dependency between the collective data group and the another object, and
an influence value is calculated to indicated an influence degree of dependency between the objects, wherein the influence value is a percentage value that is evenly distributed in accordance with a number of data in the collective data group, for dependency between data in the collective data group and the another object.

13. A non-transitory computer-readable medium containing a software analysis program for causing a computer to execute the software analysis method according to claim 12.

14. A software analysis device comprising:
a processor;
a first analyzing unit that executed by the processor to statically analyze a structure of a source code of software and analyzes dependency between objects of the software;
a code processing unit that executed by the processor to correct the source code to create a corrected code by inserting a first function indicating an entry of a function described in the source code and a second function indicating an exit of the function into the function; and
a second analyzing unit that executed by the processor to execute a program indicated by the corrected code to acquire first information regarding an operation of the objects and analyzes dependency between the objects based on the first information,
wherein the software analysis device analyzes dependency between the objects based on an analysis result of the first analyzing unit and an analysis result of the second analyzing unit,
wherein when an object that is determined to have dependency with another object in the analysis result of the second analyzing unit is included in a collective data group of the software, the software analysis device generates an analysis result indicating that there is dependency between the collective data group and the another object, and
an influence value is calculated to indicated an influence degree of dependency between the objects, wherein the influence value is a percentage value that is evenly distributed in accordance with a number of data in the collective data group, for dependency between data in the collective data group and the another object.

15. A software analysis system comprising:
a processor;
a first analyzing unit that executed by the processor to statically analyze a structure of a source code of software and analyzes dependency between objects of the software; and
a second analyzing unit that executed by the processor to execute a program indicated by the source code to acquire first information regarding an operation of the objects and analyzes dependency between the objects based on the first information,
wherein the software analysis system analyzes dependency between the objects based on an analysis result of the first analyzing unit and an analysis result of the second analyzing unit,
wherein when an object that is determined to have dependency with another object in the analysis result of the second analyzing unit is included in a collective data group of the software, the software analysis system generates an analysis result indicating that there is dependency between the collective data group and the another object, and
an influence value is calculated to indicated an influence degree of dependency between the objects, wherein the influence value is a percentage value that is evenly distributed in accordance with a number of data in the collective data group, for dependency between data in the collective data group and the another object.

* * * * *